(12) United States Patent
Kordick et al.

(10) Patent No.: US 11,662,240 B2
(45) Date of Patent: May 30, 2023

(54) VARIABLE RATE AIR METERING SYSTEM

(71) Applicant: AG MANUFACTURING & TECHNOLOGY, INC., Prole, IA (US)

(72) Inventors: Rusty Kordick, Norwalk, IA (US); Justin Kean, Ankeny, IA (US); Ryan Hanrahan, Prole, IA (US); Kenneth Hyde, Lacona, IA (US)

(73) Assignee: AG MANUFACTURING & TECHNOLOGY, INC., Prole, IA (US)

( * ) Notice: Subject to any disclaimer, the term of this patent is extended or adjusted under 35 U.S.C. 154(b) by 151 days.

(21) Appl. No.: 17/012,201

(22) Filed: Sep. 4, 2020

(65) Prior Publication Data

US 2021/0072063 A1  Mar. 11, 2021

Related U.S. Application Data

(60) Provisional application No. 62/896,418, filed on Sep. 5, 2019.

(51) Int. Cl.
*G01F 11/26* (2006.01)
*A01C 19/02* (2006.01)
*A01C 7/10* (2006.01)

(52) U.S. Cl.
CPC ............ *G01F 11/268* (2013.01); *A01C 7/102* (2013.01); *A01C 19/02* (2013.01); *G01F 11/261* (2013.01)

(58) Field of Classification Search
CPC ......... A01C 7/082; A01C 7/044; A01C 7/088; A01C 7/081; A01C 7/084; A01C 7/102; A01C 19/02; A01C 7/127; E02F 9/2095; G01F 11/268
See application file for complete search history.

(56) References Cited

U.S. PATENT DOCUMENTS

| | | |
|---|---|---|
| 2,943,584 A | 7/1960 | Palmer |
| 5,831,542 A | 11/1998 | Thomas |
| 7,377,221 B1 | 5/2008 | Brockmeier |
| 7,617,785 B2 | 11/2009 | Wendte |
| 8,516,969 B2 | 8/2013 | Wendte et al. |
| 8,863,676 B2 | 10/2014 | Brockmann et al. |
| 10,375,876 B2 | 8/2019 | Kordick |
| 2012/0103238 A1 | 5/2012 | Beaujot |
| 2012/0174844 A1 | 7/2012 | Friggstad |
| 2013/0192503 A1 | 8/2013 | Henry |
| 2015/0216109 A1 | 8/2015 | Meyer |

(Continued)

*Primary Examiner* — Vishal Pancholi
*Assistant Examiner* — Robert K Nichols, II
(74) *Attorney, Agent, or Firm* — Brown Winick Law Firm; Christopher A. Proskey

(57) ABSTRACT

A variable rate air metering system is provided. The system includes seed meter cartridges, each having a housing, a meter wheel, and a variable speed electric motor operatively connected to the seed meter cartridge. The seed meter cartridges provide flowable material to distribution manifolds, which are configured to distribute flowable material to multiple row outputs for deposition into a field. A control system is configured to control operation of the distribution manifolds for enabling/disabling dispersement of flowable material to row units. The control system is also configured to adjust the dispersement rate of flowable material by the seed meter cartridges in association with the opening/disabling the dispersement of flowable material to row outputs.

20 Claims, 40 Drawing Sheets

(56) References Cited

U.S. PATENT DOCUMENTS

| | | | |
|---|---|---|---|
| 2015/0319917 A1* | 11/2015 | Henry | A01C 7/081 |
| | | | 111/174 |
| 2016/0037713 A1 | 2/2016 | Wendte | |
| 2016/0120097 A1 | 5/2016 | Chahley | |
| 2016/0120106 A1 | 5/2016 | Zacharias | |
| 2016/0205867 A1 | 7/2016 | Montag | |
| 2017/0196162 A1* | 7/2017 | Sheppard | |
| 2017/0273235 A1* | 9/2017 | Kordick | A01C 7/046 |
| 2019/0364718 A1* | 12/2019 | Garner | A01C 7/105 |

* cited by examiner

VARIABLE RATE AIR METERING SYSTEM

CROSS REFERENCE TO RELATED APPLICATIONS

This application also claims priority to U.S. Provisional Application No. Provisional Patent Application 62/896,418, filed Sep. 5, 2019 and titled "COMMODITY CART DRIVE SYSTEM", the entirety of which is hereby fully incorporated by reference herein.

FIELD OF ENDEAVOR

The present disclosure generally relates to agricultural machines and more particularly to agricultural machines for dispersing flowable materials in a field.

OVERVIEW

Many different types of planters are used for farming in planting crops, such as wheat and soybeans. However, with different seed sizes and shapes for different crops it is hard to properly set the planter for varying seed population. Some planters allow multiple sections to shut off to stop seed dispersement for individual rows or sets of rows.

Conventional planters, such as for soybeans, utilize a mechanical transmission with a drive tire contacting the ground. In operation, the dispersement rate of seed or other flowable materials is set by the RPM's of the drive tire as the planter moves across the field. There is little, if any, ability to adjust or change the dispersement rate on the fly. Some planters are configurable to adjust dispersement rates during operation, for example, to facilitate seeding different areas of a field with different seed populations. With improvements in precision farming and the use of GPS, accurate planting is critical for improving yield and minimizing cost. Some more sophisticated planters utilize GPS to adjust seed population.

One specific example of a current way of controlling the distribution manifold is described in U.S. Pat. No. 5,980,163 titled DISTRIBUTION MANIFOLD FOR AIR SEEDER, which is hereby fully incorporated by reference herein. In this example, a tow-behind air seeder implement carries one or more bulk seed hoppers that pass seed in bulk by gravity, pneumatics, or other techniques to seed distribution manifold. A plurality of tubes or conduits from a distribution manifold are in communication with a plurality of ground working tools. The distribution manifold operates to split incoming bulk seed from hoppers into the multiple tubes to define multiple paths for seed to the ground working tools.

A different configuration for an air seeder can be seen in a John Deere 1990 Central Commodity System (CCS™) system, which is commercially available. A hopper, manifold, and ground tools are integrated in one tow-behind implement. Details about this type of bulk product handling system between a bulk quantity of product and ground working tools can be seen with reference to U.S. Pat. No. 5,980,163.

One example of a distribution manifold is shown in U.S. Pat. No. 5,980,163. Seed inlets would be underneath and in communication with bulk seed from hopper. Individual tubes would connect to a plurality of seeding shoes. A changeable cartridge with plural seed meters is installable between inlets and outlets.

As explained in detail more in U.S. Pat. No. 5,980,163, a hexagonal-in-cross-section driveshaft extends across the manifold width. A plurality of seed meters are mounted in spaced-apart positions axially on the hex axle. Bulk seed is distributed through inlets to the tops of seed meters\. A driven gear attached to the hex axle rotates proportionally to ground speed of the air seeder by a chain drive connected to a ground-contacting wheel on or associated with air seeder. Thus, all of seed meters rotate at the same speed and in accordance with rotation of the hex shaft. As explained in U.S. Pat. No. 5,980,163, these seed meters have alternating ridges and valleys and are designed to take up essentially the same amount of seed per valley. Thus, the seed meters essentially divide (the incoming bulk flowable materials and discharge it serially into an individual output. While this relates the seed distribution to ground speed, it is limited to that relationship. It also is limited to rotating all the seed meters on the hex axle at the same rate.

There is recognition in the state-of-the-art of the need for more control at this distribution manifold. For example, U.S. Pat. No. 8,196,534, titled VOLUMETRIC METERING SYSTEM WITH CLUTCH BASED SECTIONAL SHUT-OFF, which is hereby fully incorporated by reference herein, discusses the need for sectional shut-off of the manifold. It can be desirable to shut off a section of the manifold if, for example, less than the full width of the planter is required. One example is header rows. Sometimes the full planter width is not needed. Without such sectional shutoff, seed would be wasted by planting outside desired planting boundaries or by overlapping previously seeded ground. Other examples of need for sectional shut-down are known in this art.

The solution for sectional shut-down in U.S. Pat. No. 8,196,534 is to utilize a clutch at a multiple part seed meter. As explained, when the clutch is engaged, the entire multi-part seed meter rotates with the hex axle. The clutch can be disengaged by an electrical signal to a coil at the seed meter. The inner part of the seed meter at the hex axle continues to spin with the hex-axle, but the outer seed-holding part of the meter stops rotating. Thus seed distribution from that meter stops. However, this is a relatively complex structure and could be subject to maintenance and durability issues. It also is limited to control of on/off of turning of the seed meter. It cannot adjust its speed of the hex axle. Thus, there still is room for improvement in this technological art. Yet another solution, which also provides variable rate air seeding is discussed in U.S. Pat. No. 10,375,876, titled VARIABLE RATE AIR SEEDING SYSTEM FOR SEEDS, which is hereby fully incorporated by reference.

There is a need in the art for an improved method and system for metering and distributing flowable materials to row units for planting or other dispersing in a field that also permits rows to be enables/disabled during operation.

Accordingly, it is an objective of the present disclosure to provide a system for dispensing flowable materials (e.g., seed, fertilizer, soil treatments, and/or other flowable materials) at a variable rate and while facilitating row control so as to reduce excess planting and seed waste.

Another objective of the present disclosure is to provide a variable air metering system that is decreases overhead costs for flowable materials.

Yet another objective of the present disclosure is to provide a variable air metering system that facilitates dynamic adjustment of dispersement rate of flowable materials according to varying field conditions.

Another objective of the present disclosure is to provide a variable air metering system that facilitates dynamic adjustment of dispersement rate of flowable materials as rows are dynamically enabled/disabled according to varying field conditions.

Yet another objective of the present disclosure is to provide a variable air metering system that increases consistency in dispersement rate of flowable materials in a field.

Another object of the disclosure is to provide a variable air metering system that provides unique functionality.

Yet another object of the disclosure is to provide a variable air metering system that is safe to use.

Another object of the disclosure is to provide a variable air metering system that is compact in size.

Yet another object of the disclosure is to provide a variable air metering system that is efficient.

Another object of the disclosure is to provide a variable air metering system that is easy to install.

Yet another object of the disclosure is to provide a variable air metering system that is inexpensive to manufacture.

Another object of the disclosure is to provide a variable air metering system that has a long useful life.

Yet another object of the disclosure is to provide a variable air metering system that is high quality.

Another object of the disclosure is to provide a variable air metering system that is strong, robust, and durable.

These and other objectives, aspects, features, or advantages will become apparent from the specification, figures, and claims.

SUMMARY OF THE INVENTION

In one or more embodiments, a variable rate air metering system is provided. The system includes seed meter cartridges, each having a housing, a meter wheel, and a variable speed electric motor operatively connected to the seed meter cartridge. The system includes distribution manifolds having an input and a plurality of row outputs. The seed meter cartridges are configured to provide flowable material to the distribution manifolds. The distribution manifolds are configured to distribute flowable material to the plurality of row outputs connected to respective row units for deposition into a field. The system further includes a control system configured to control operation of the seed meter cartridges and the distribution manifolds. In one or more embodiments, the control system is configured to control opening and closing of the plurality of row outputs of the distribution manifold and is also configured to adjust dispersement rate of flowable material by the seed meter cartridges in association with opening or closing the plurality of row outputs.

In one or more implementations, each of the plurality of row outputs of the distribution manifold has a gate that is configured to open and close and has an actuator configured to open and close the gate. In one or more implementations, the control system is configured to control a rate at which flowable material is dispersed by the seed meter cartridge and transported to the input of the distribution manifold by adjusting the speed of the variable speed electric motor of the seed meter cartridge. In one or more implementations, the control system is also configured to adjust the rate at which flowable material is dispersed by the seed meter cartridge, using the variable speed electric motor, to inhibit changes in the rate at which flowable material is provided through one of the plurality of row outputs having an open gate when the gate of another one of the plurality of row outputs is opened or closed.

In one or more embodiments, a variable rate air metering system is provided. The system has a manifold having a plurality of inlets, a plurality of outlets, a plurality of sockets, and a plurality of seed meter cartridges. The manifold is configured to receive and hold the plurality of seed meter cartridges within the sockets. The seed meter cartridges each have a housing, a meter wheel, and a variable speed electric motor. The variable speed electric motor is configured to control rotation of the meter wheel. In each of the seed meter cartridges, rotation of the meter wheel by the variable speed electric motor causes the meter wheel to dispense flowable material from the seed meter cartridge. The variable speed electric motor of each of the plurality of seed meter cartridges is configured to control a rate at which flowable material is dispensed from the seed meter cartridge.

In one or more arrangements, a seed meter cartridge is provided. The seed meter cartridge has a housing, a meter wheel, an input port, and an output port. The meter wheel has a plurality of pockets configured to receive flowable material therein. The seed meter cartridge has a variable speed electric motor operatively connected to the meter wheel. The variable speed electric motor is configured to control rotation of the meter wheel. The seed meter cartridge also includes a brush positioned within the housing of the seed meter cartridge. The brush is configured to help guide the flowable material into the plurality of pockets of the meter wheel as the meter wheel rotates. Rotation of the meter wheel by the variable speed electric motor transports the flowable material from the input port to the output port.

Figure 1:
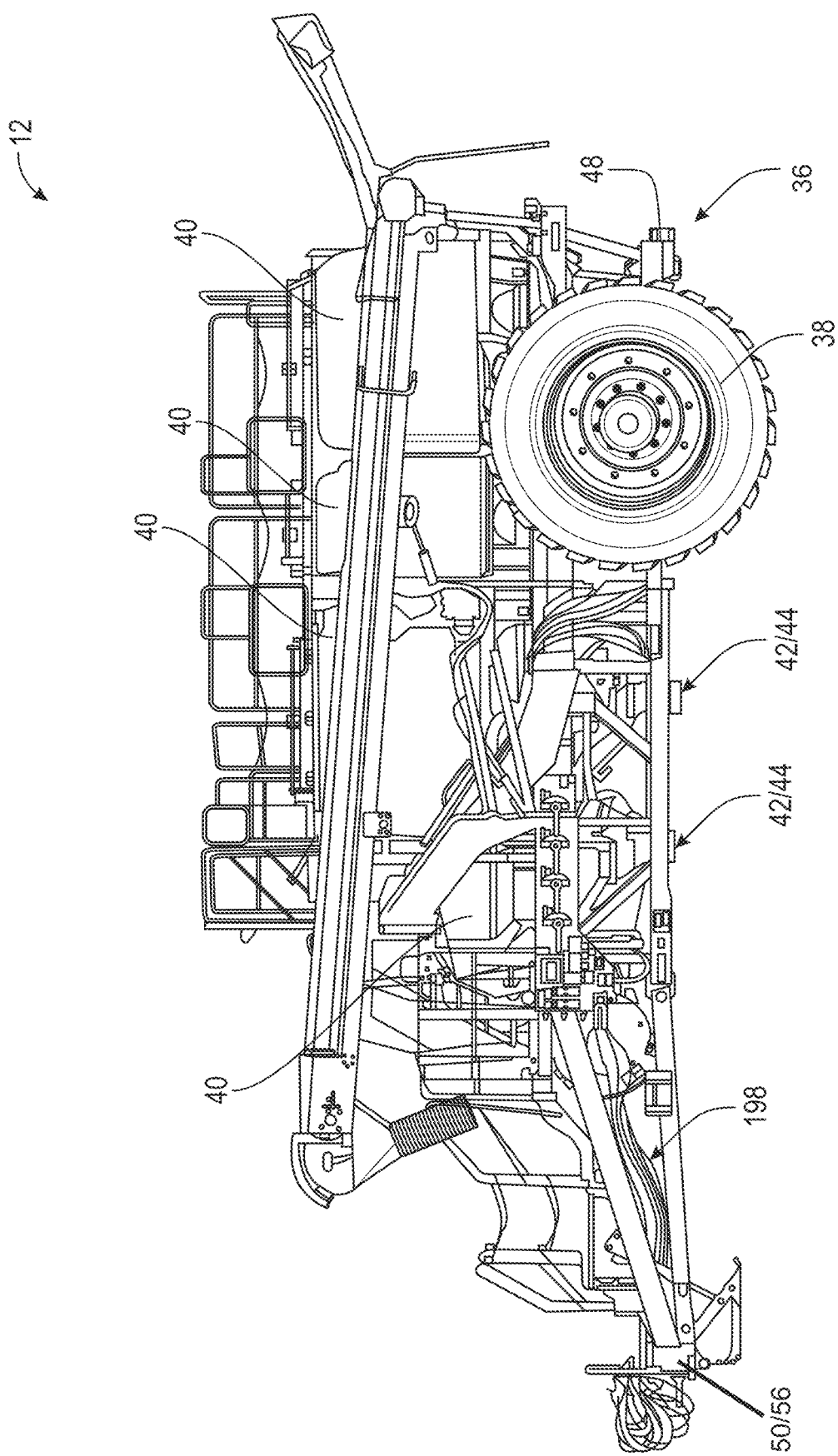
FIG. 1 shows left side view of a commodity cart, in accordance with one or more embodiments.
Figure 2:
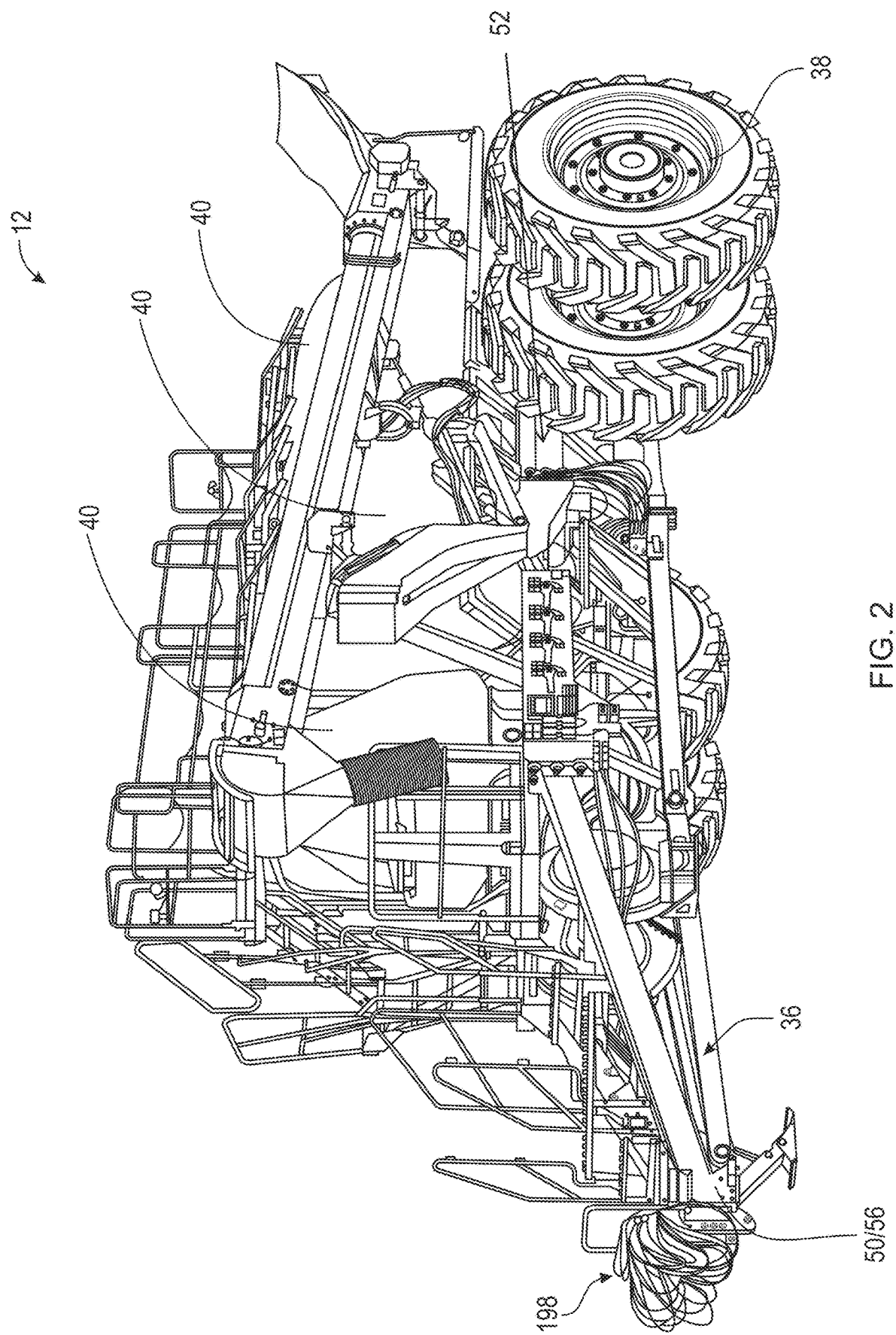
FIG. 2 shows left front perspective view of a commodity cart, in accordance with one or more embodiments.
Figure 3:
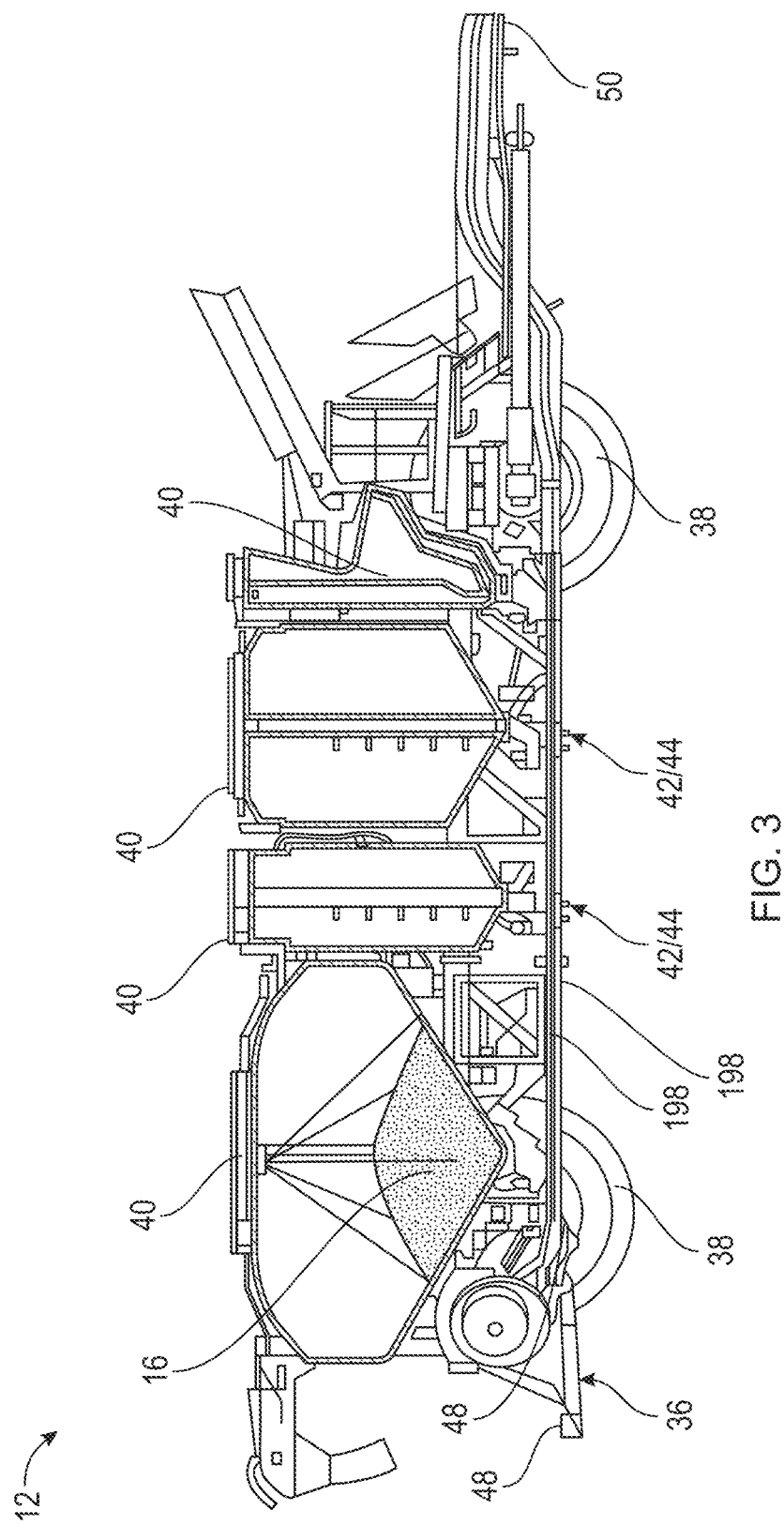
FIG. 3 shows a cross section side view of a commodity cart, in accordance with one or more embodiments.
Figure 4:
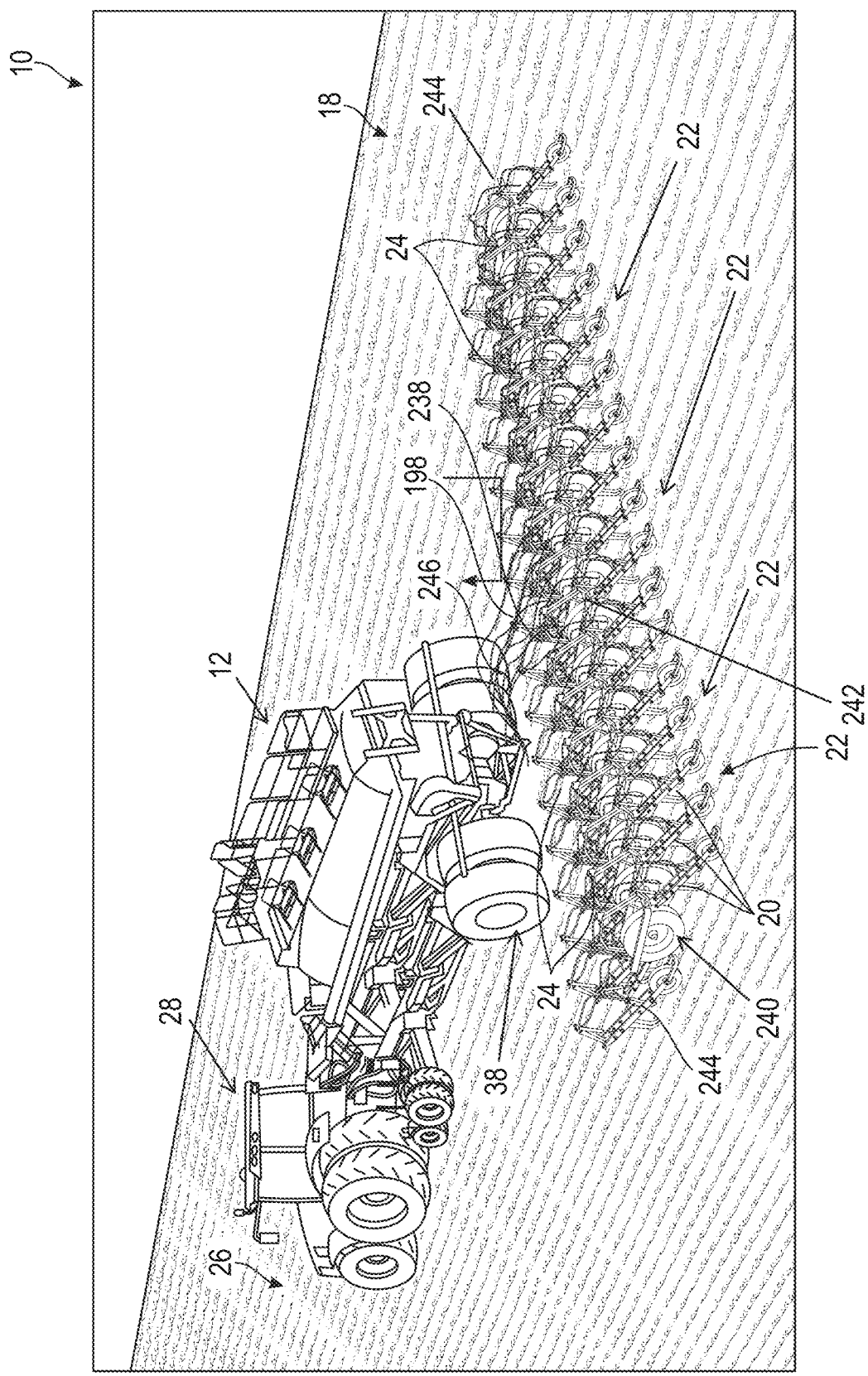
FIG. 4 shows rearward left elevated perspective view of a tractor towing a commodity cart and planter in a field, in accordance with one or more embodiments.
Figure 5:
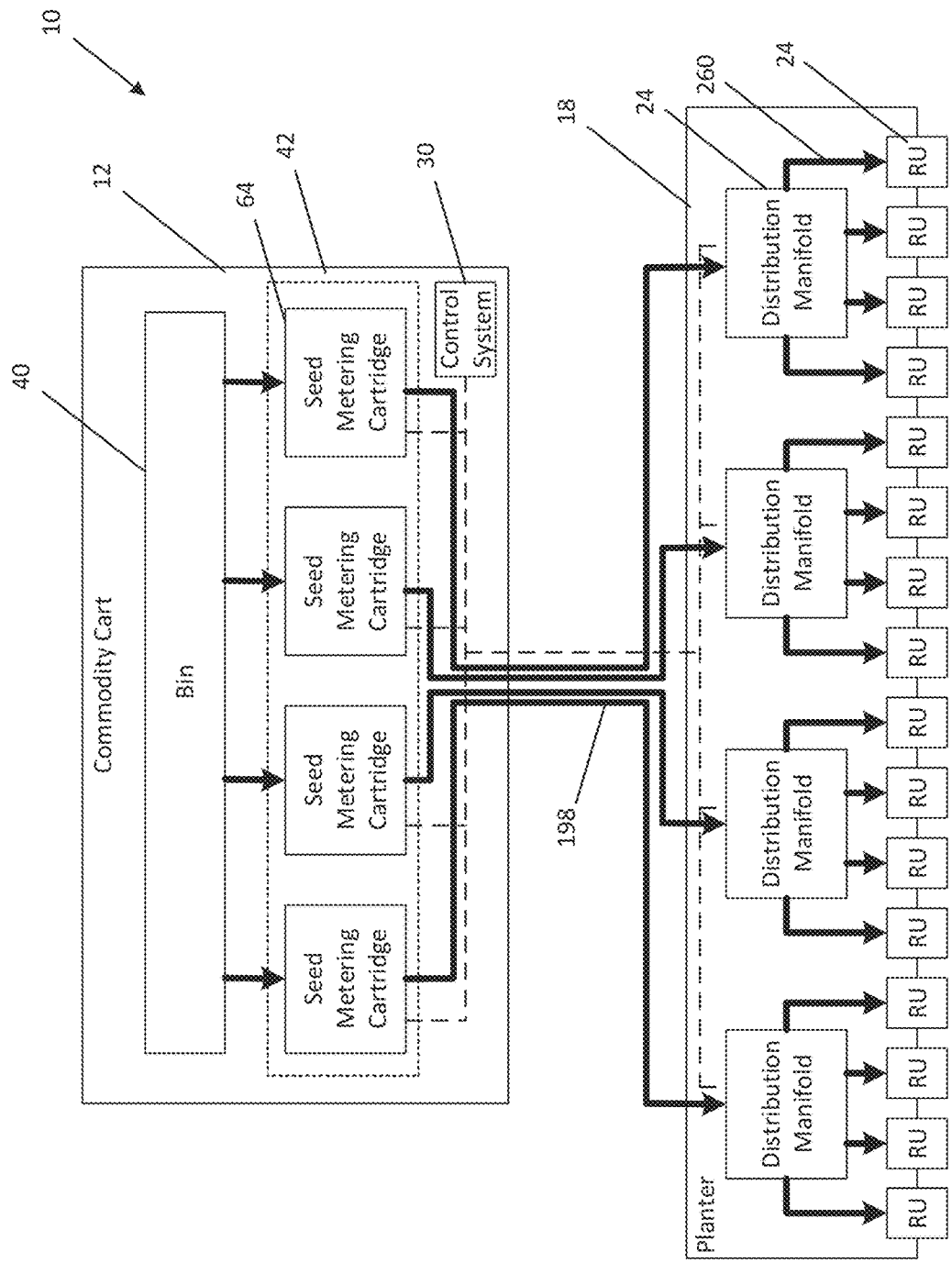
FIG. 5 shows block level diagram of a commodity cart and planter, in accordance with one or more embodiments; the view showing seed meter cartridges of metering assembly of the commodity cart distributing flowable material to distribution manifolds on the planter; the view showing each distribution manifold distributing flowable material to row units in a respective section of the planter.
Figure 6:
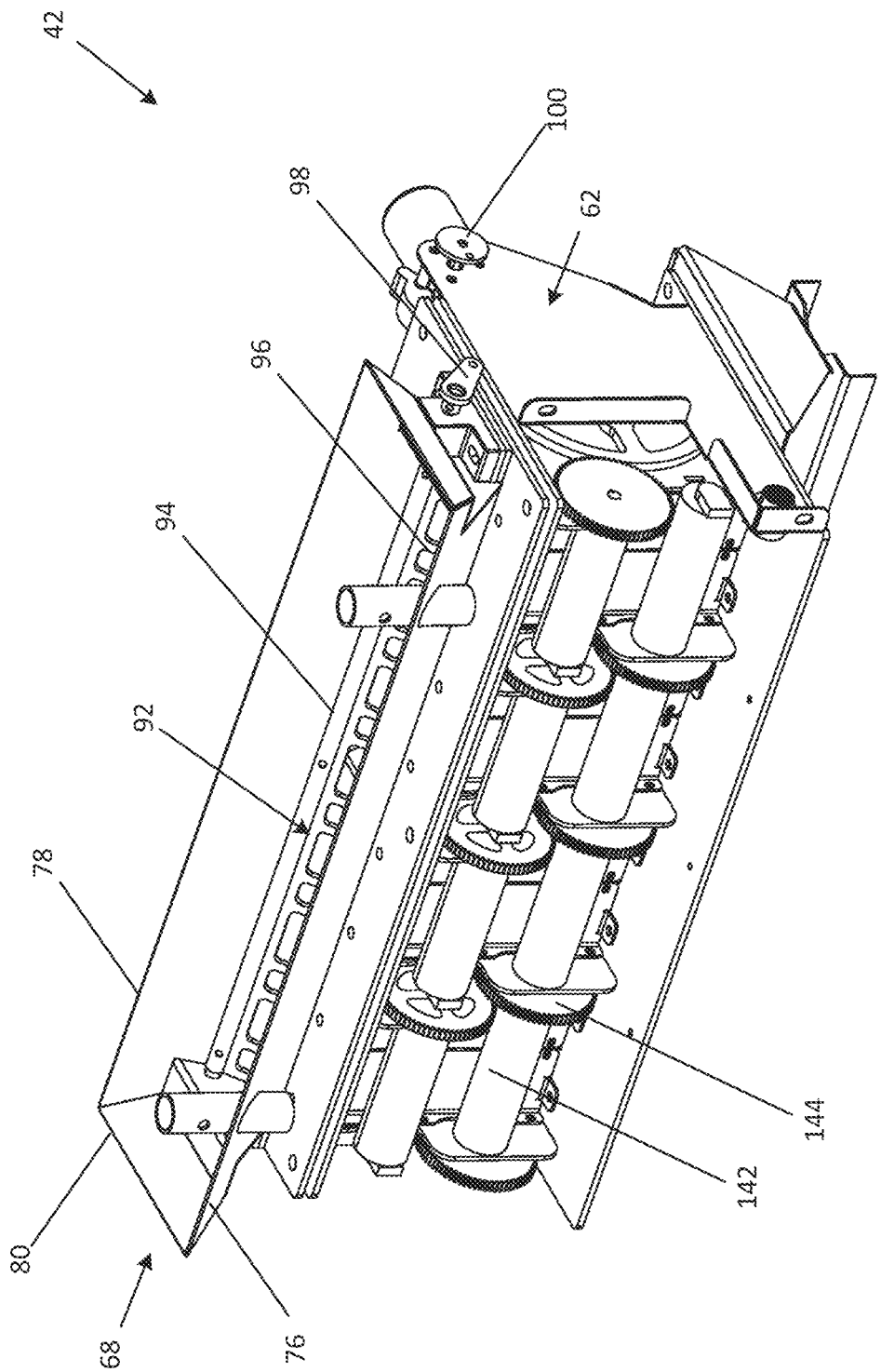
FIG. 6 shows front left elevated perspective view of a distribution assembly, in accordance with one or more embodiments; the view showing cover of the distribution assembly omitted.
Figure 7:
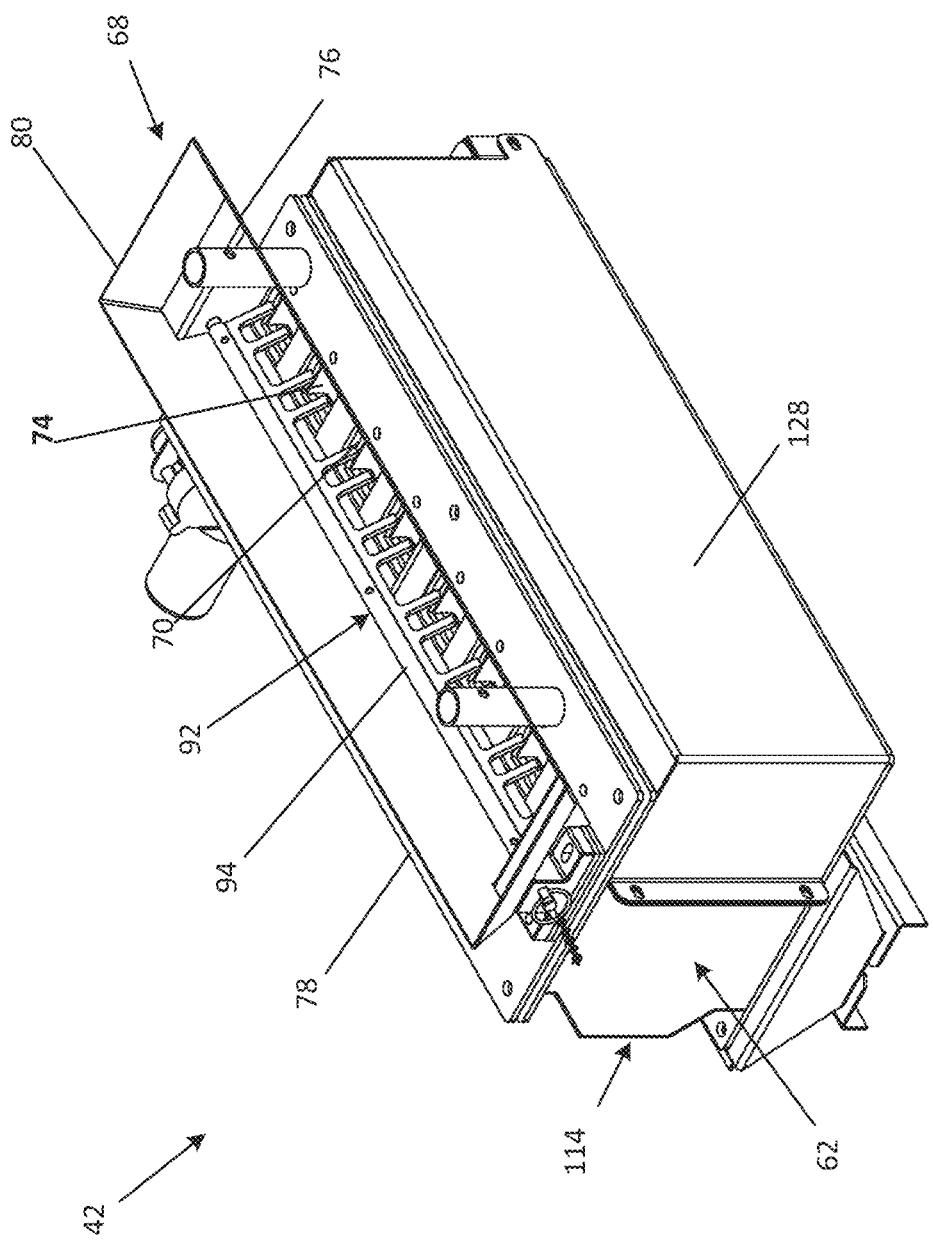
FIG. 7 shows a front right elevated perspective view of a distribution assembly, in accordance with one or more embodiments.
Figure 8:
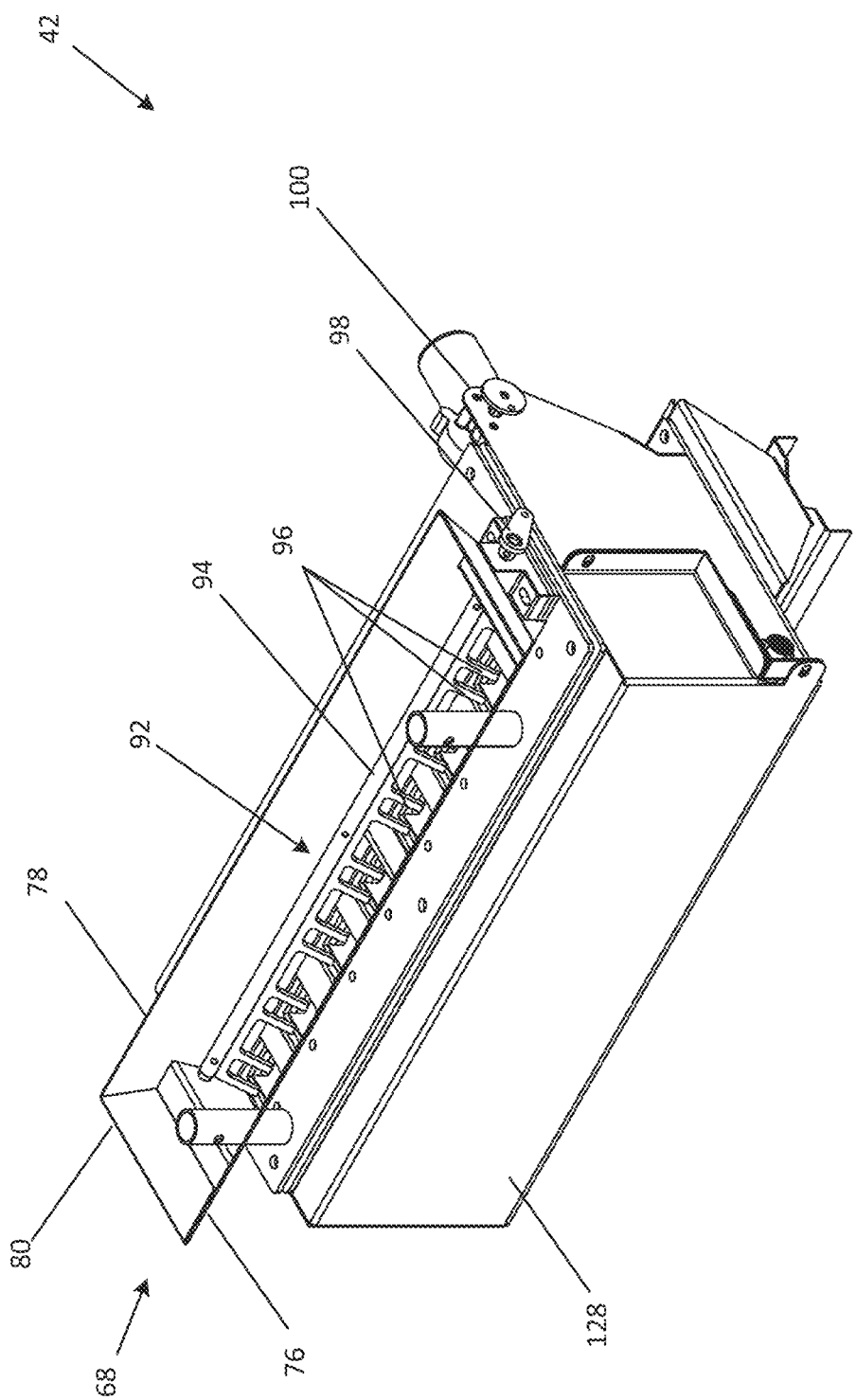
FIG. 8 shows a front left elevated perspective view of a distribution assembly, in accordance with one or more embodiments.
Figure 9:
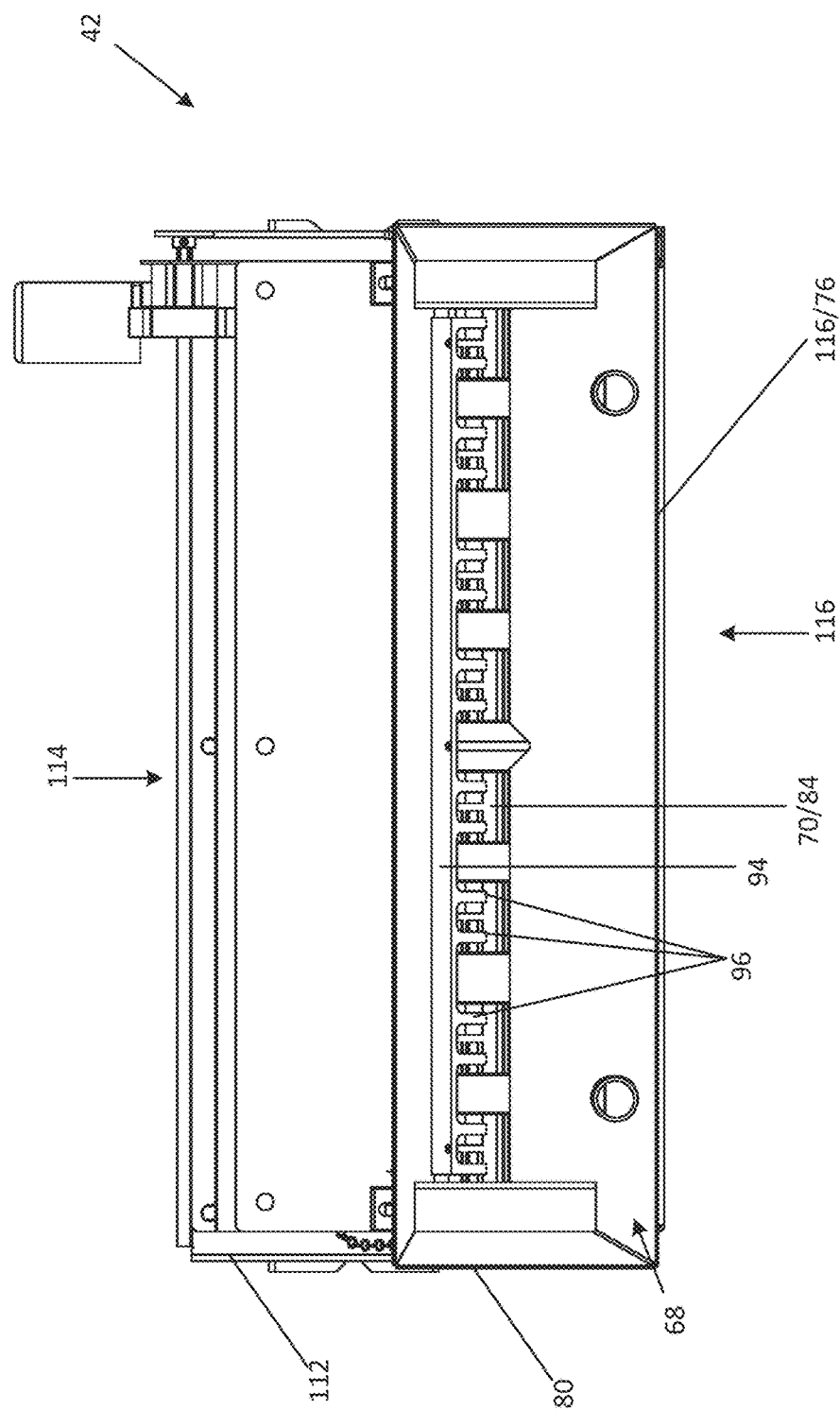
FIG. 9 shows a top view of a distribution assembly, in accordance with one or more embodiments.
Figure 10:
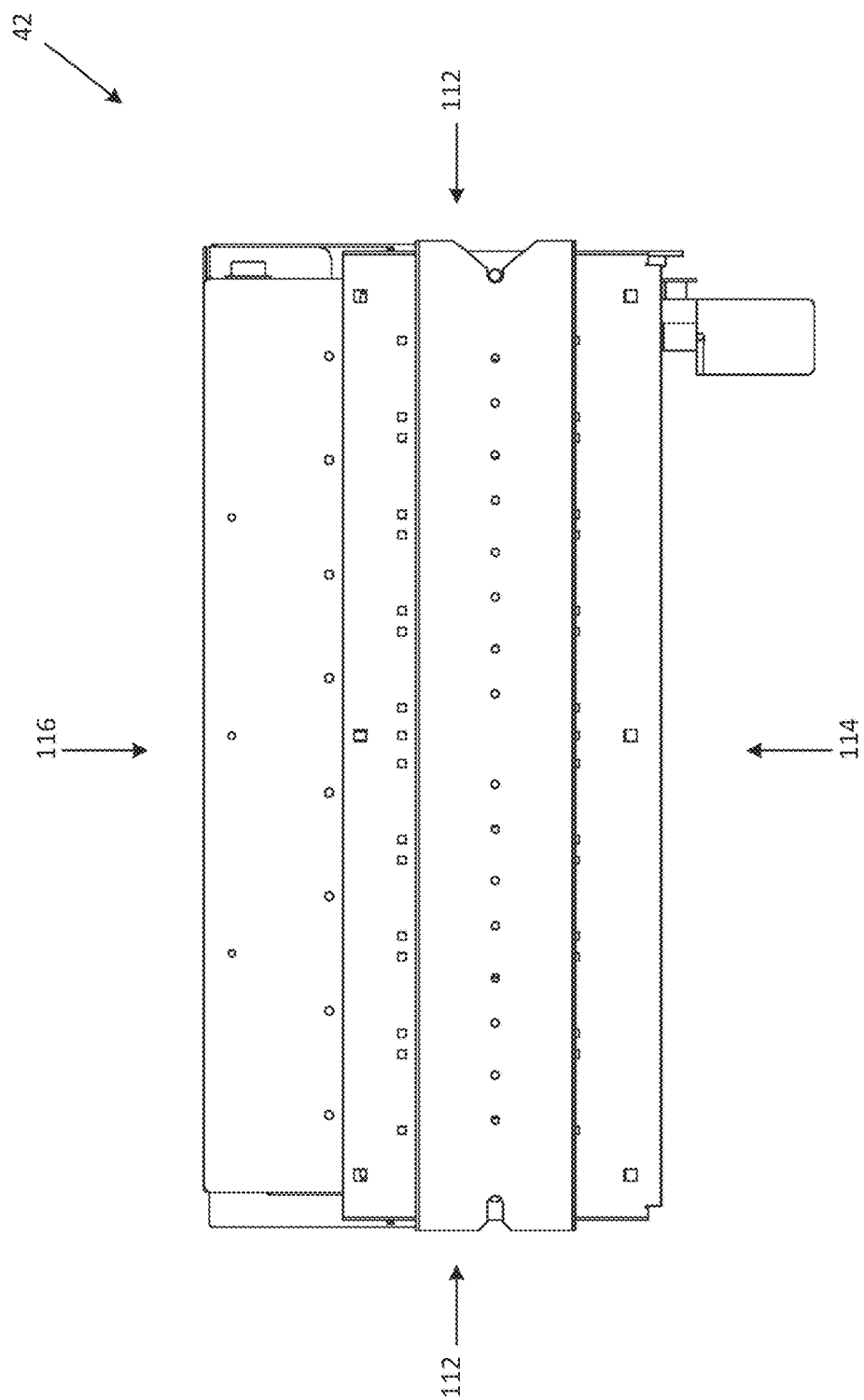
FIG. 10 shows a bottom view of a distribution assembly, in accordance with one or more embodiments.
Figure 11:
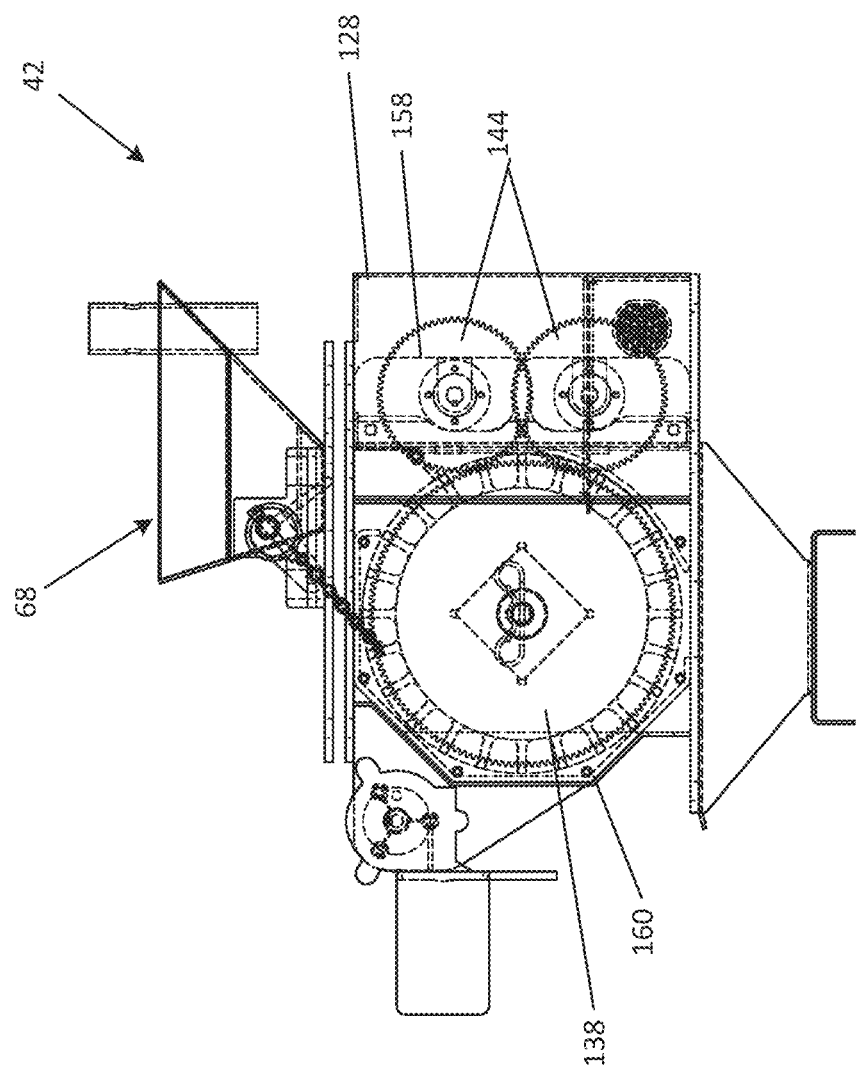
FIG. 11 shows a right side cross sectional view of a distribution assembly, in accordance with one or more embodiments.
Figure 12:
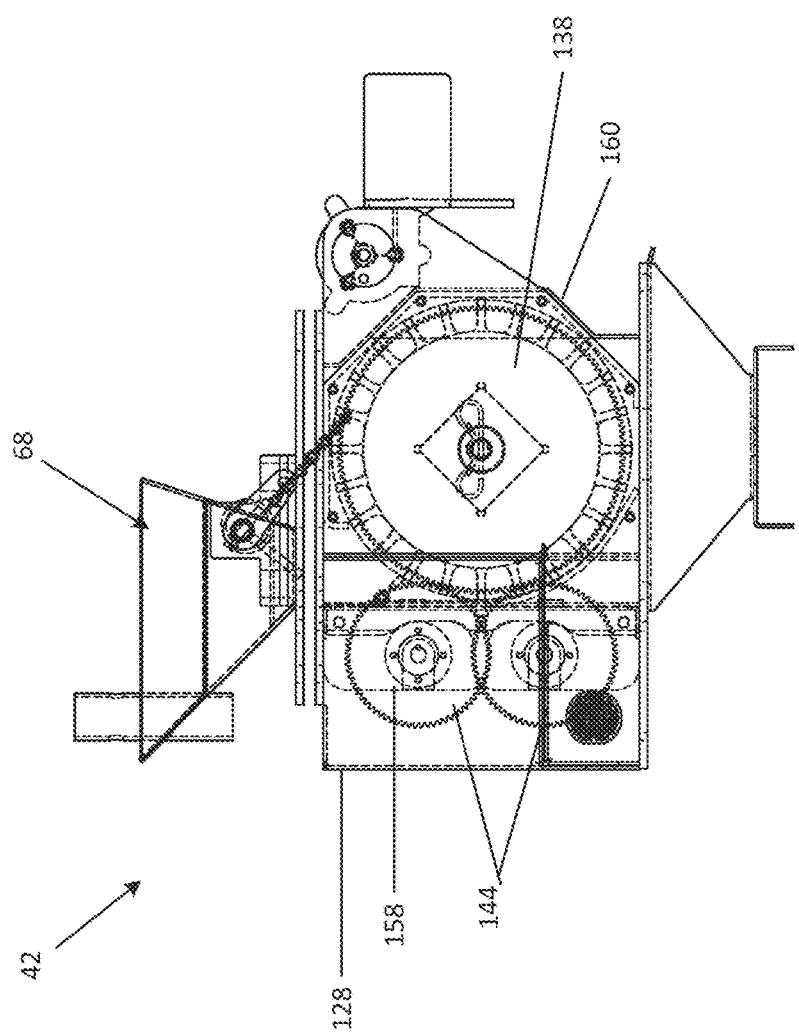
FIG. 12 shows a left side cross sectional view of a distribution assembly, in accordance with one or more embodiments.
Figure 13:
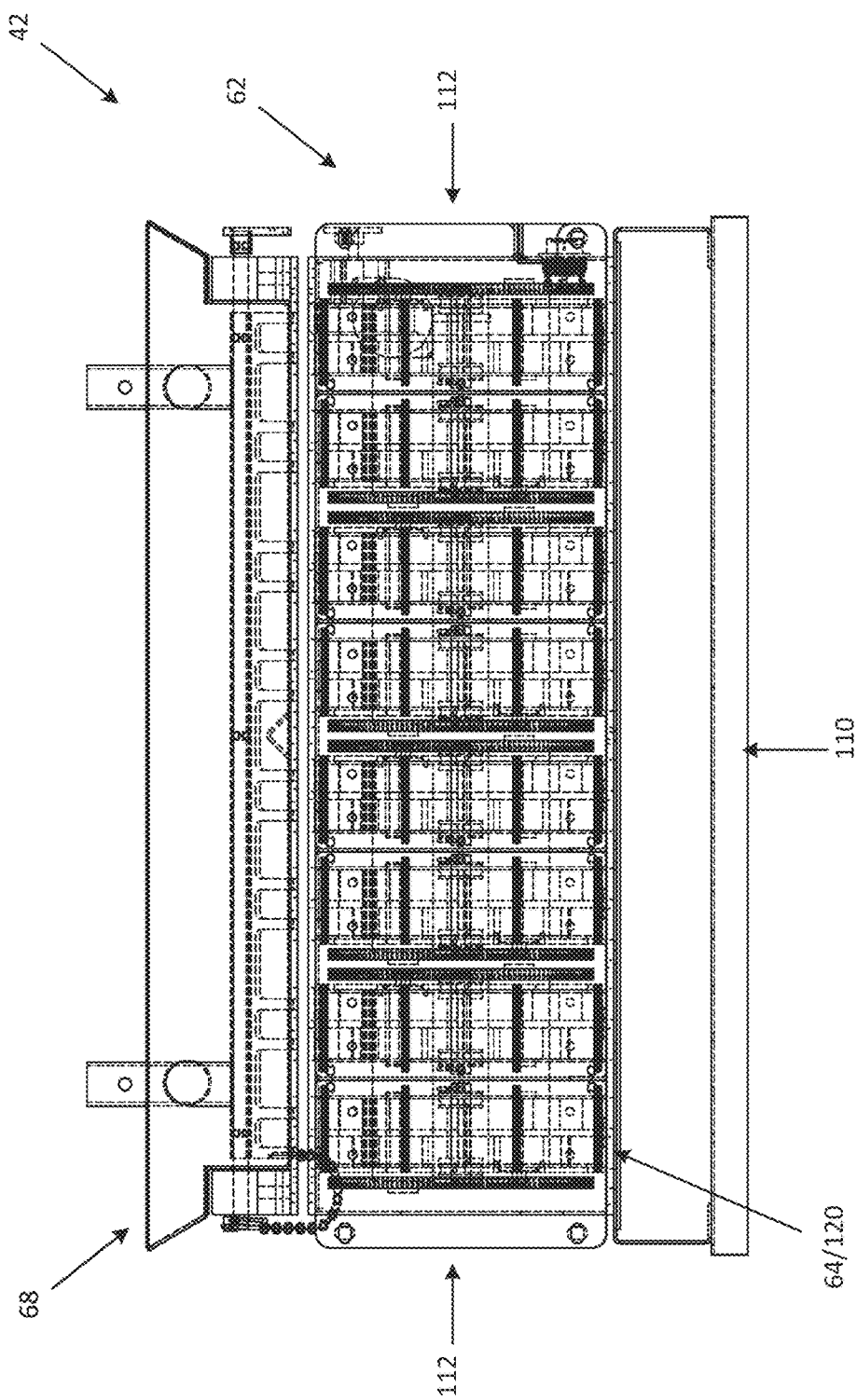
FIG. 13 shows a front view of a distribution assembly, in accordance with one or more embodiments.
Figure 14:
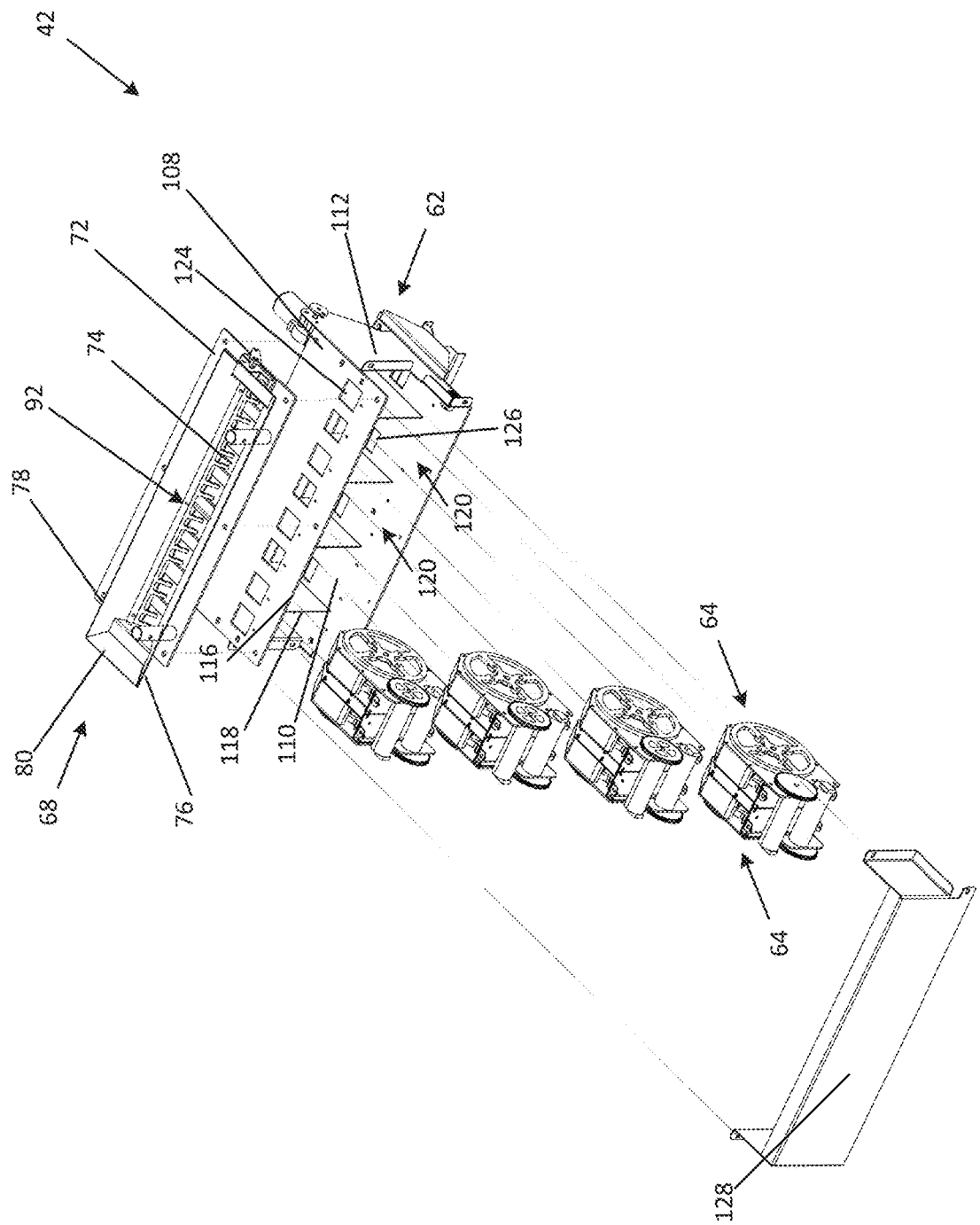
FIG. 14 shows an exploded front left elevated perspective view of a distribution assembly, in accordance with one or more embodiments.
Figure 15:
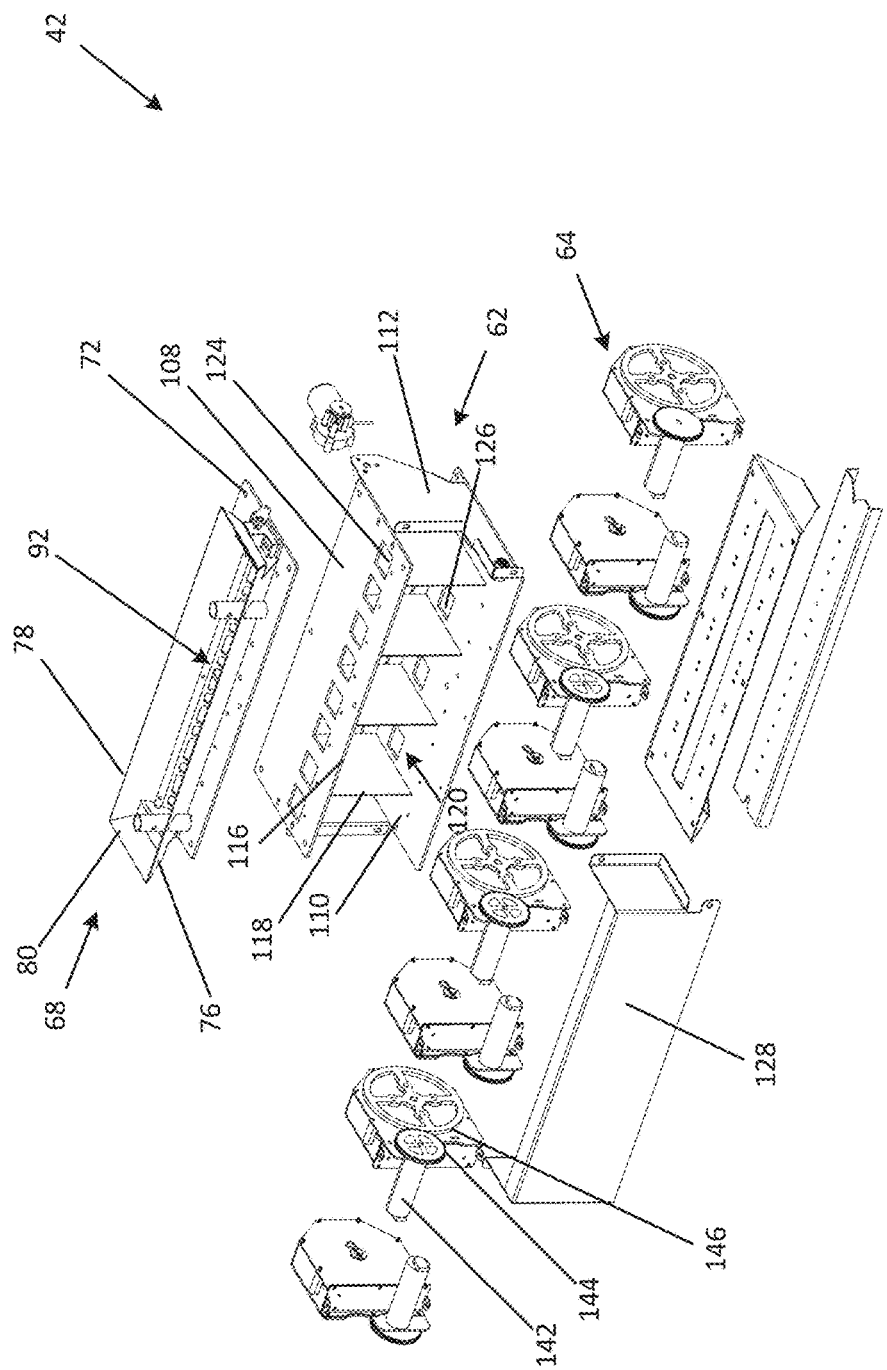
FIG. 15 shows an exploded front left elevated perspective view of a distribution assembly, in accordance with one or more embodiments.
Figure 16:
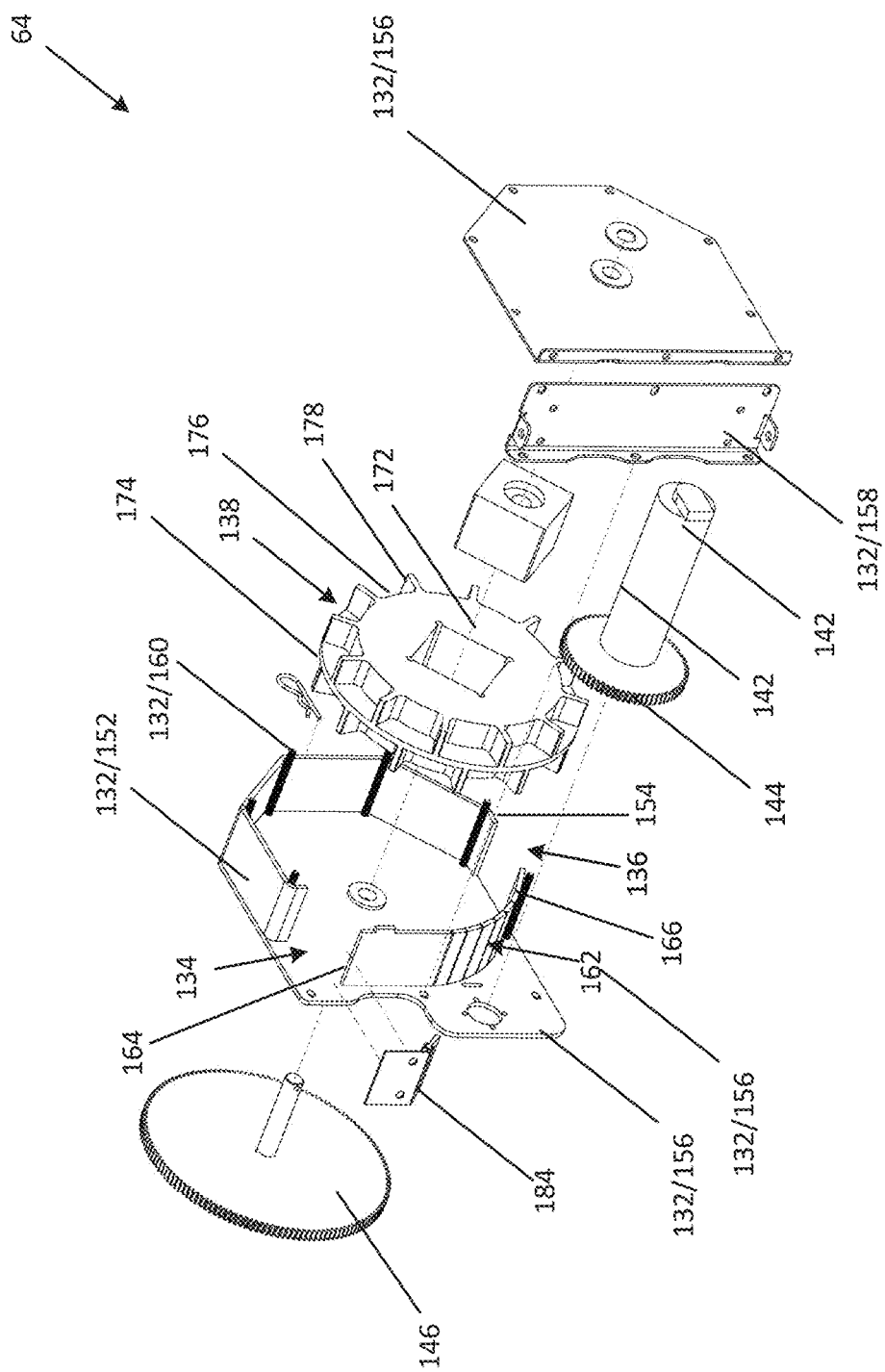
FIG. 16 shows an exploded front left elevated perspective view of a seed meter cartridge, in accordance with one or more embodiments; the view showing the seed meter cartridge with metering gear on the right side.
Figure 17:
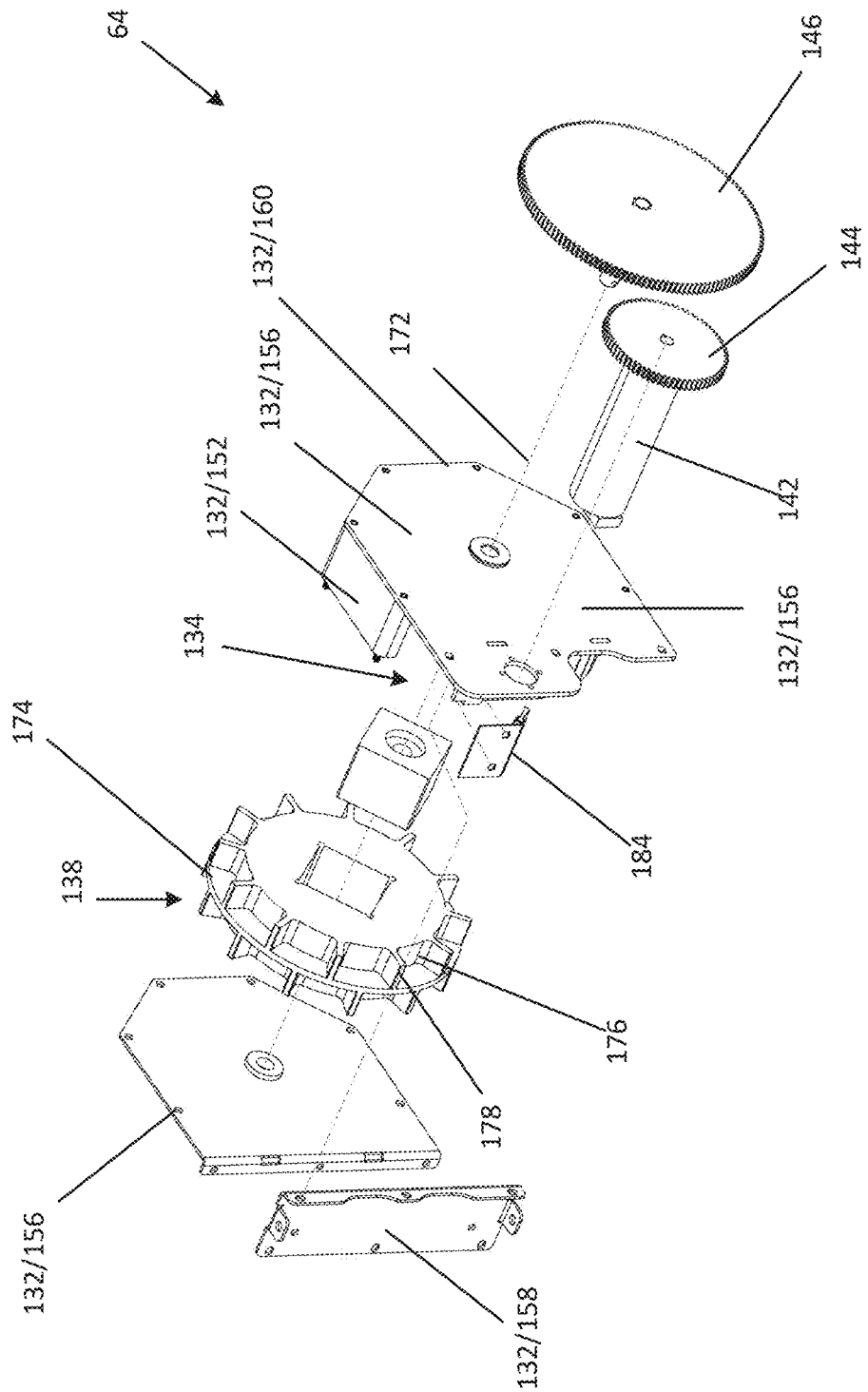
FIG. 17 shows an exploded front left elevated perspective view of the seed meter cartridge shown in FIG. 16, in accordance with one or more embodiments; the view showing the seed meter cartridge with metering gear on the left side.
Figure 18:
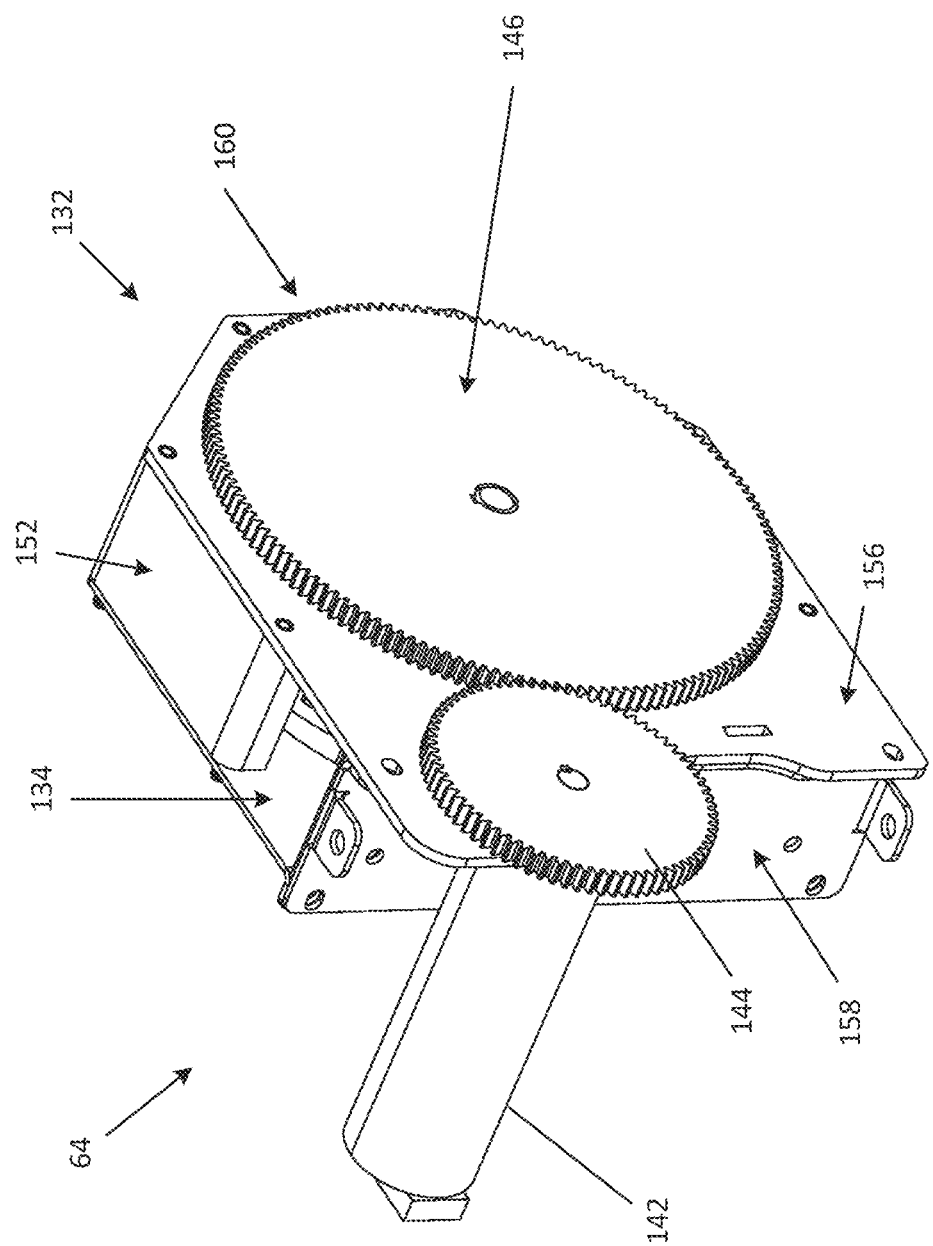
FIG. 18 shows a front left elevated perspective view of the seed meter cartridge shown in FIG. 16, in accordance with one or more embodiments; the view showing the seed meter cartridge with metering gear on the left side.
Figure 19:
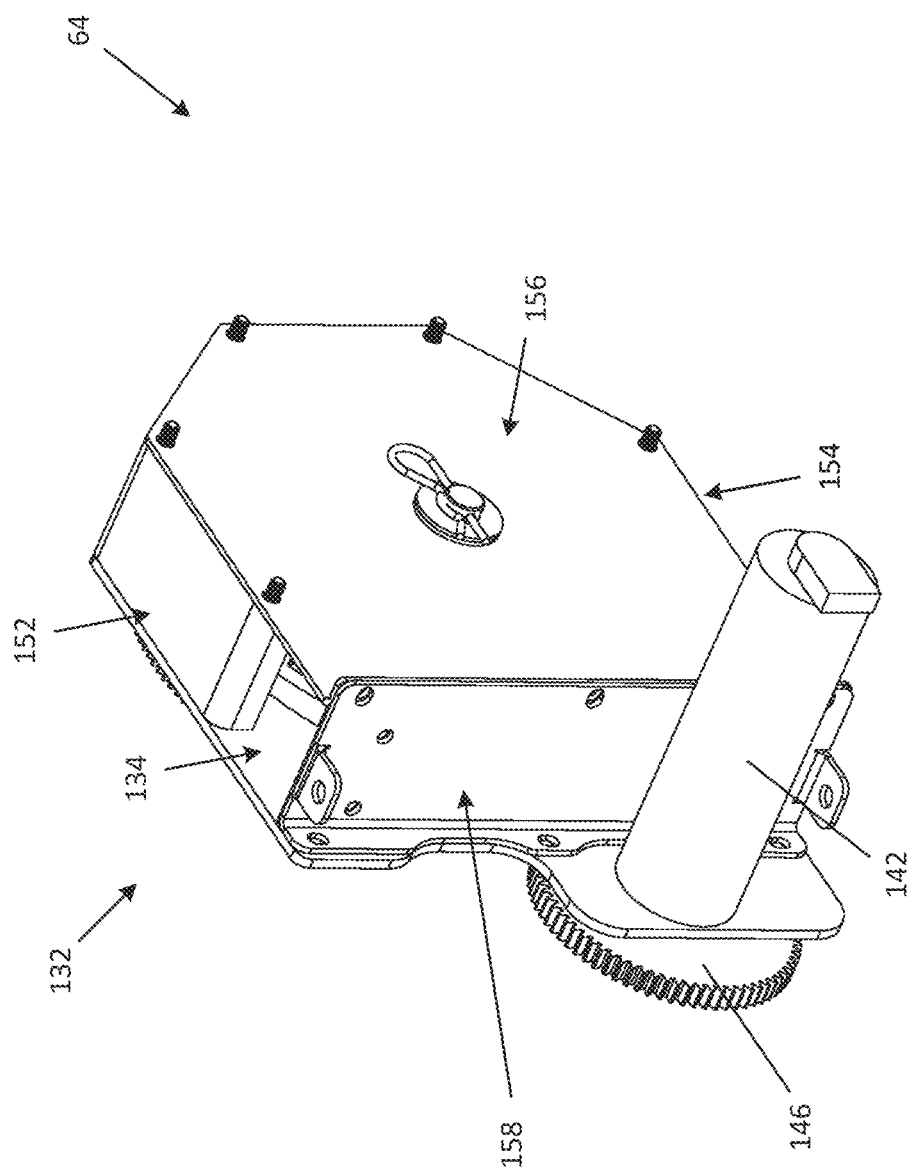
FIG. 19 shows a front left elevated perspective view of the seed meter cartridge shown in FIG. 16, in accordance with one or more embodiments; the view showing the seed meter cartridge with metering gear on the right side.
Figure 20:
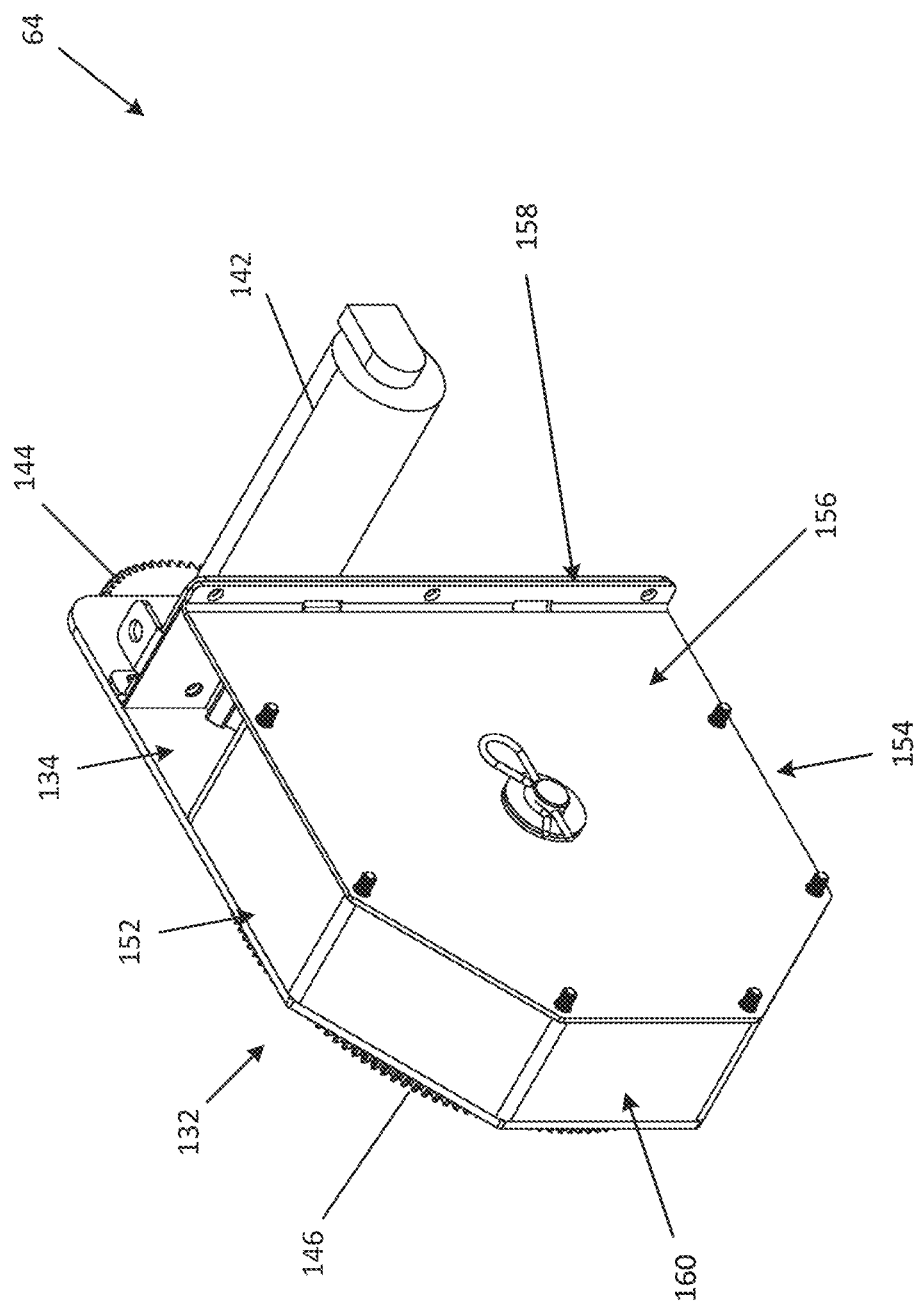
FIG. 20 shows a rear right elevated perspective view of the seed meter cartridge shown in FIG. 16, in accordance with one or more embodiments; the view showing the seed meter cartridge with metering gear on the left side.
Figure 21:
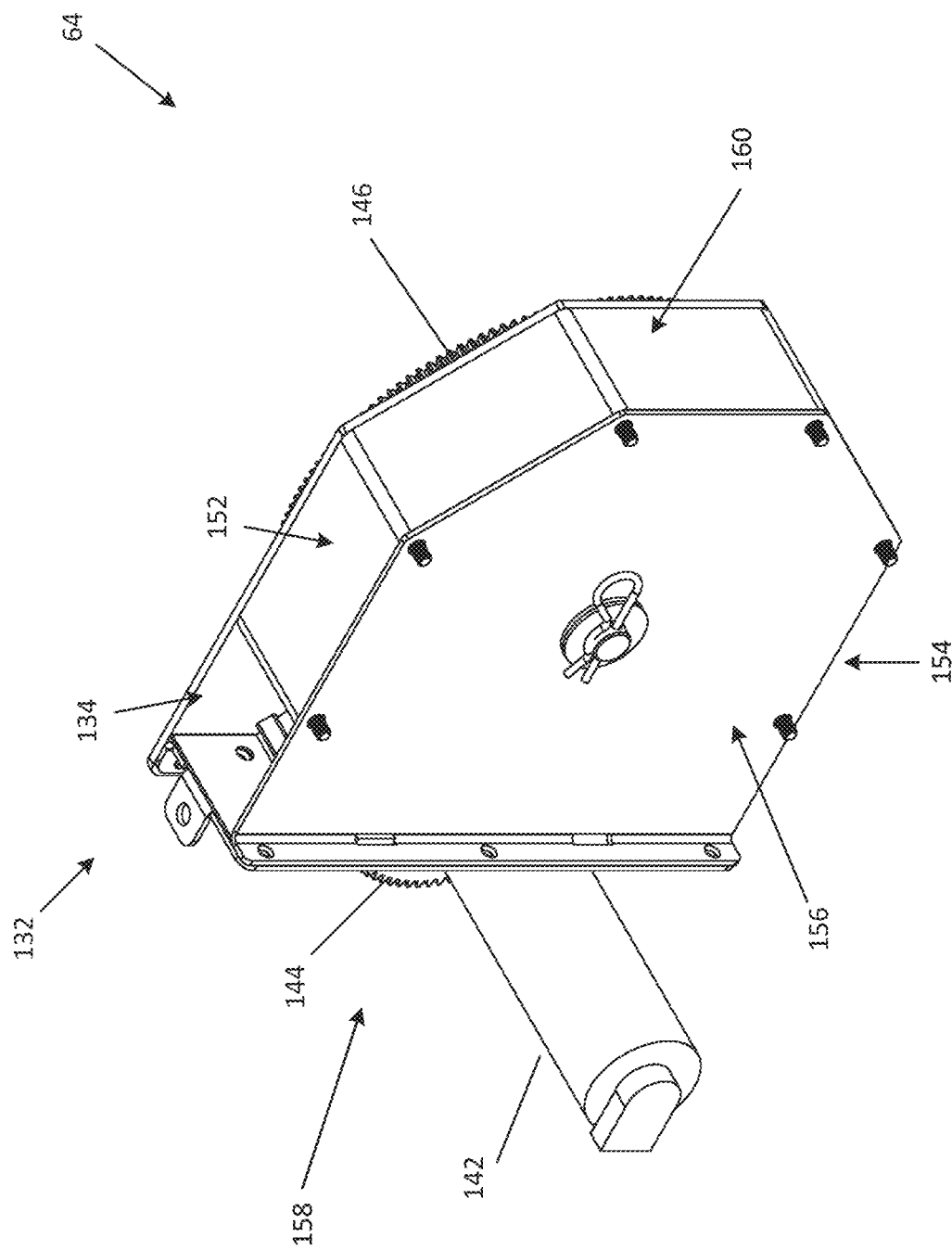
FIG. 21 shows a rear left elevated perspective view of the seed meter cartridge shown in FIG. 16, in accordance with one or more embodiments; the view showing the seed meter cartridge with metering gear on the right side.
Figure 22:
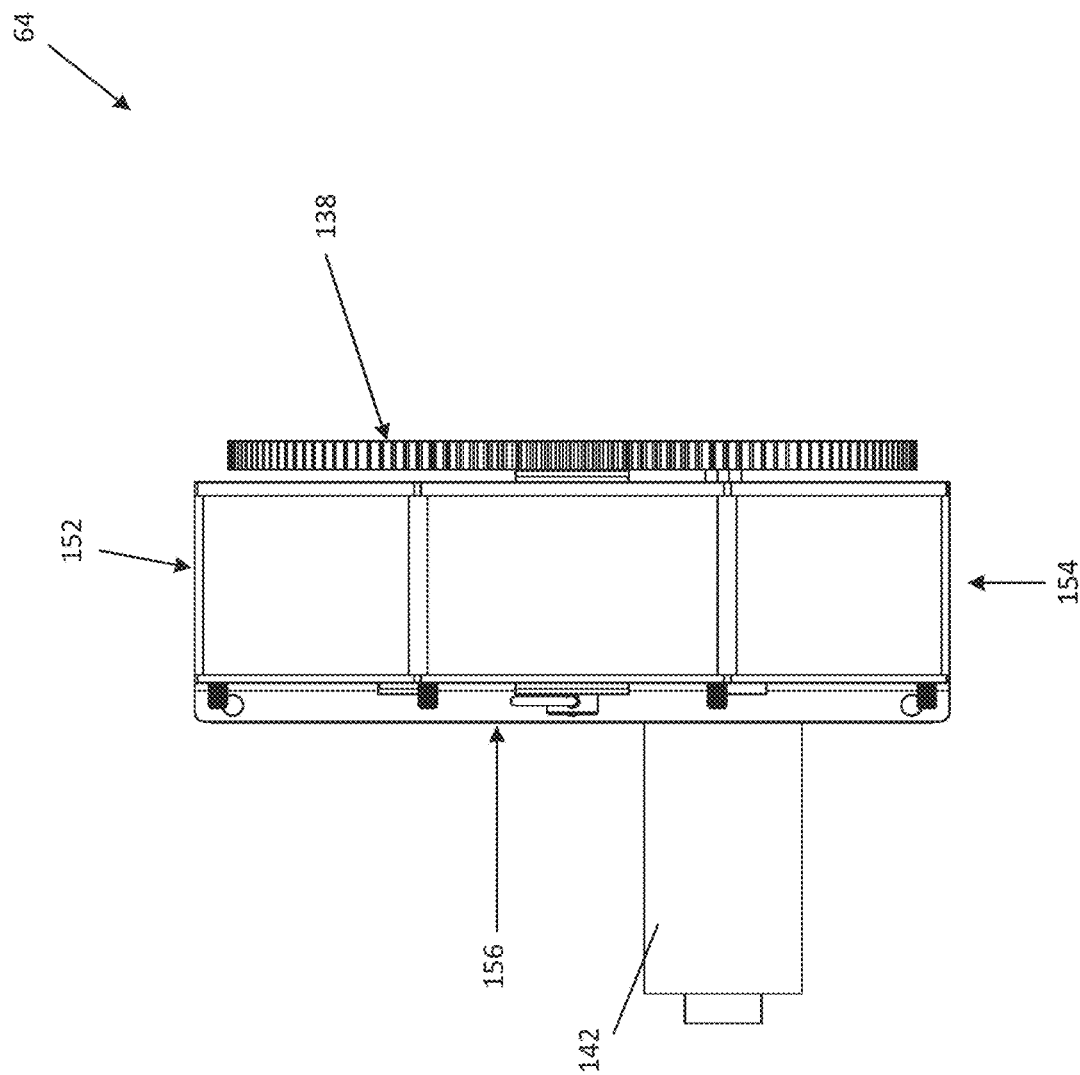
FIG. 22 shows a rear view of the seed meter cartridge shown in FIG. 16, in accordance with one or more embodiments; the view showing the seed meter cartridge with metering gear on the right side.
Figure 23:
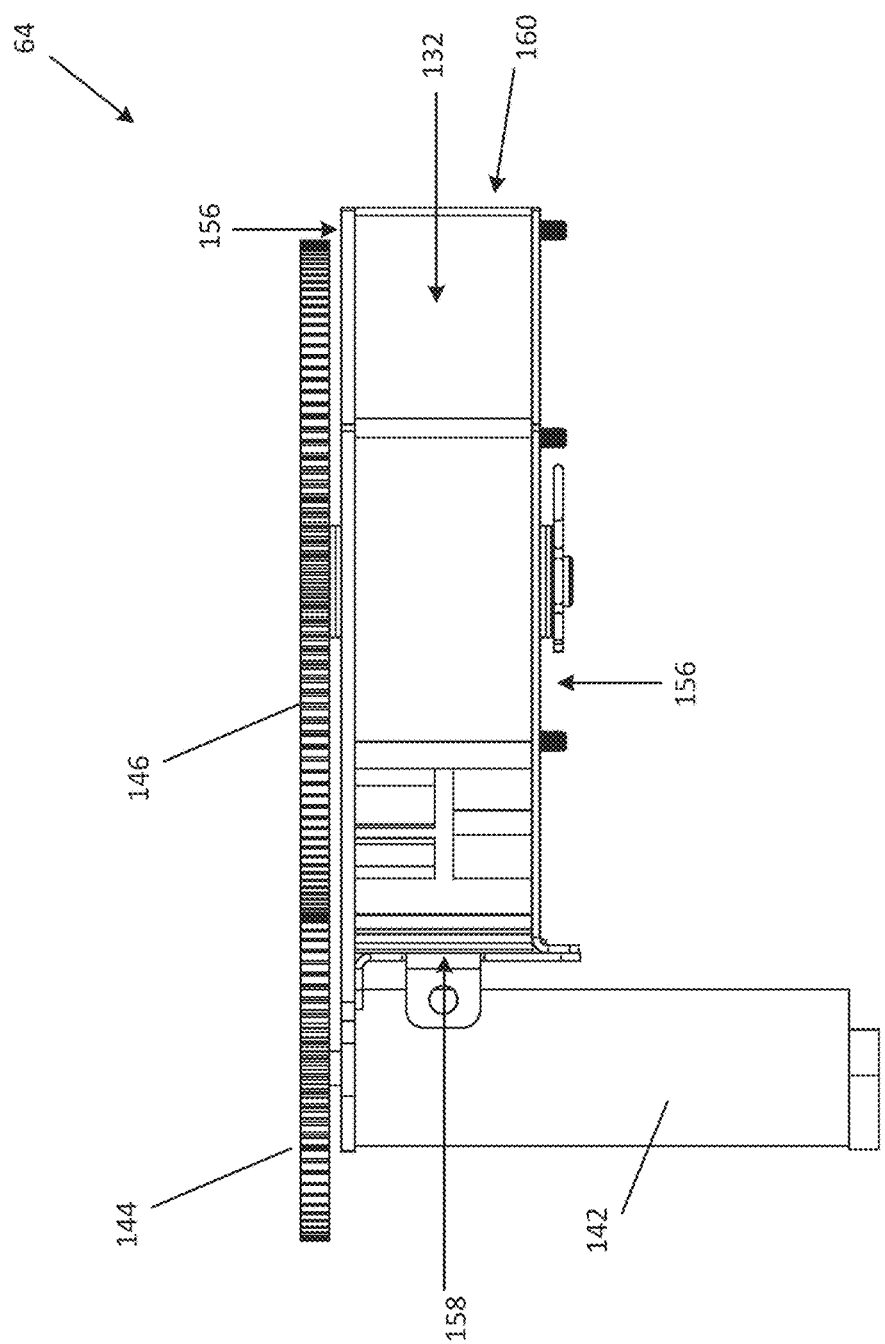
FIG. 23 shows a top view of the seed meter cartridge shown in FIG. 16, in accordance with one or more embodiments; the view showing the seed meter cartridge with metering gear on the right side.
Figure 24:
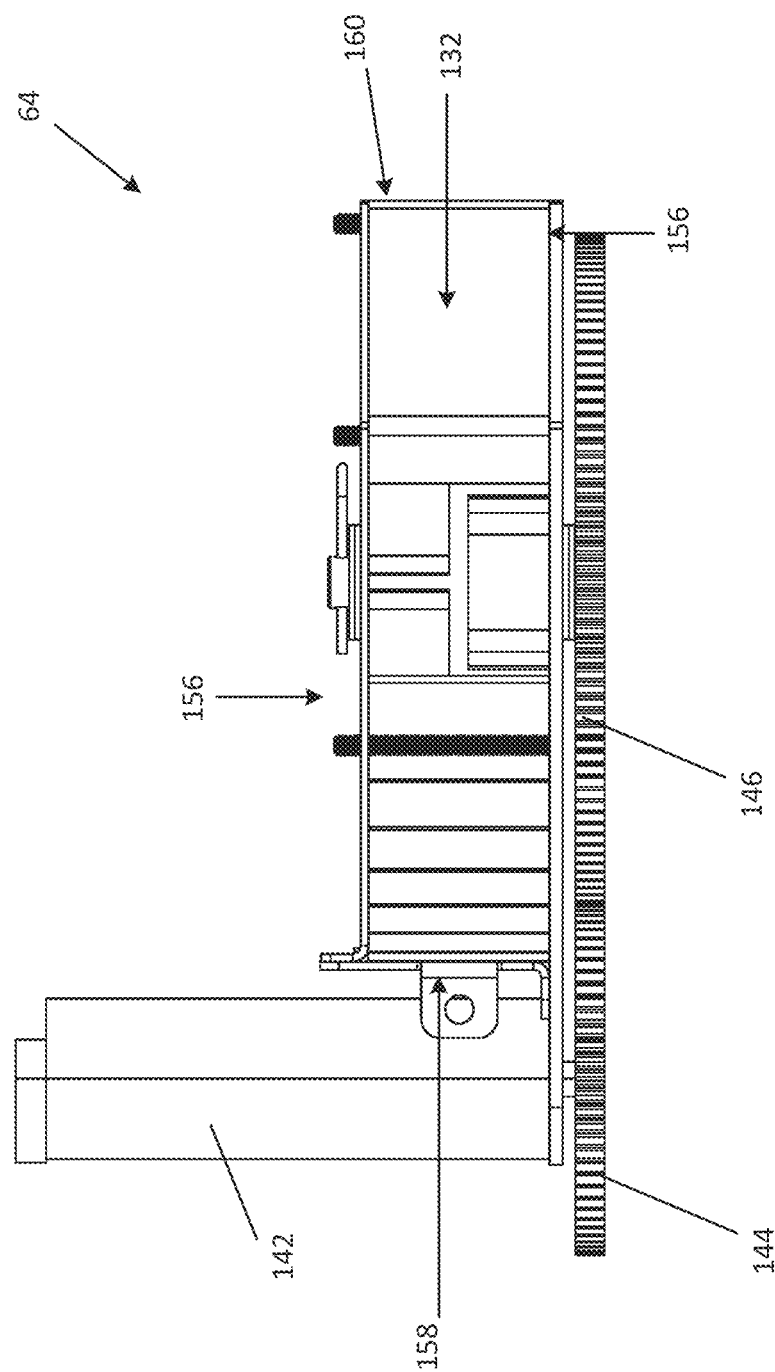
FIG. 24 shows a bottom view of the seed meter cartridge shown in FIG. 16, in accordance with one or more embodiments; the view showing the seed meter cartridge with metering gear on the right side.
Figure 25:
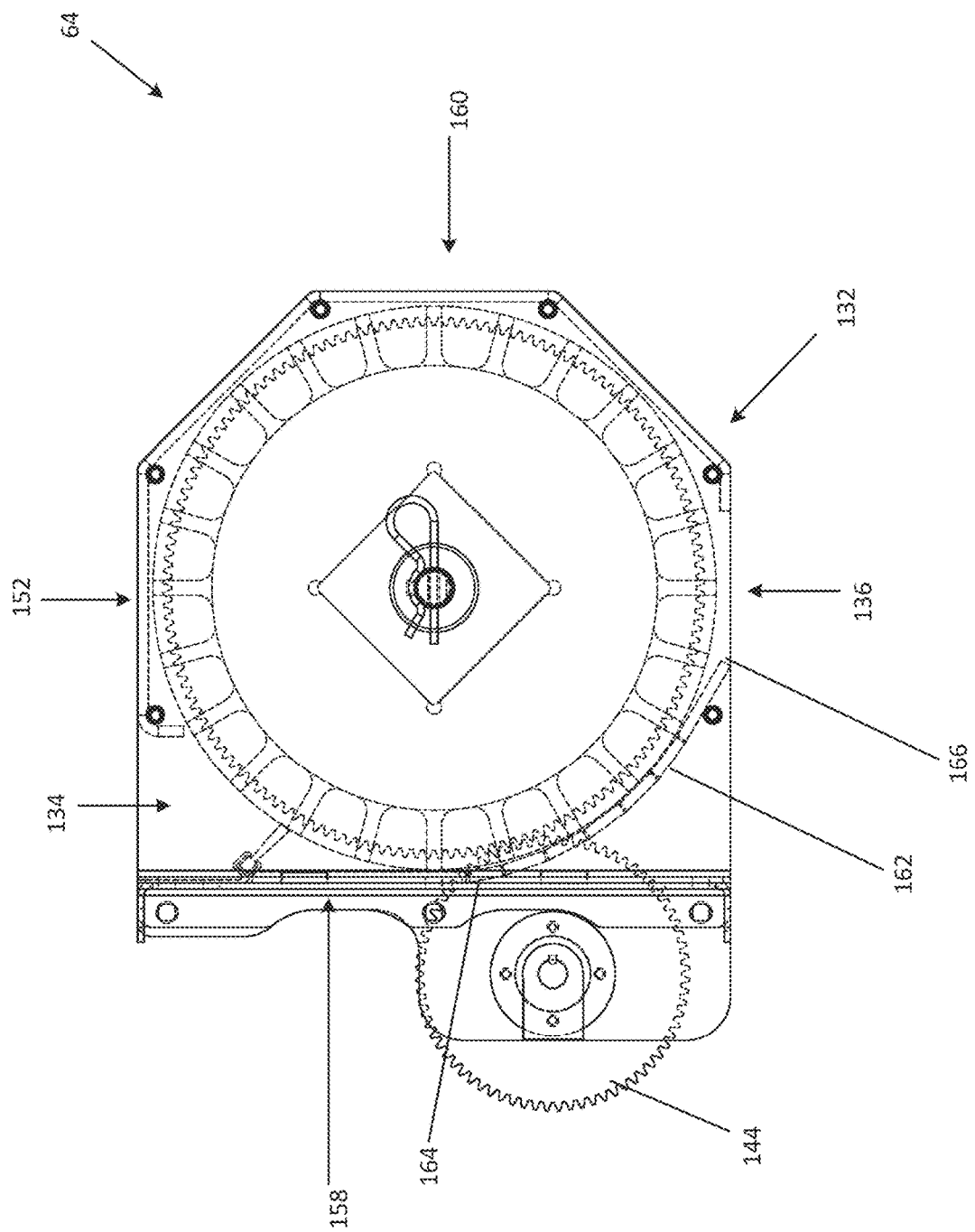
FIG. 25 shows a left side cutaway view of the seed meter cartridge shown in FIG. 16, in accordance with one or more embodiments.
Figure 26:
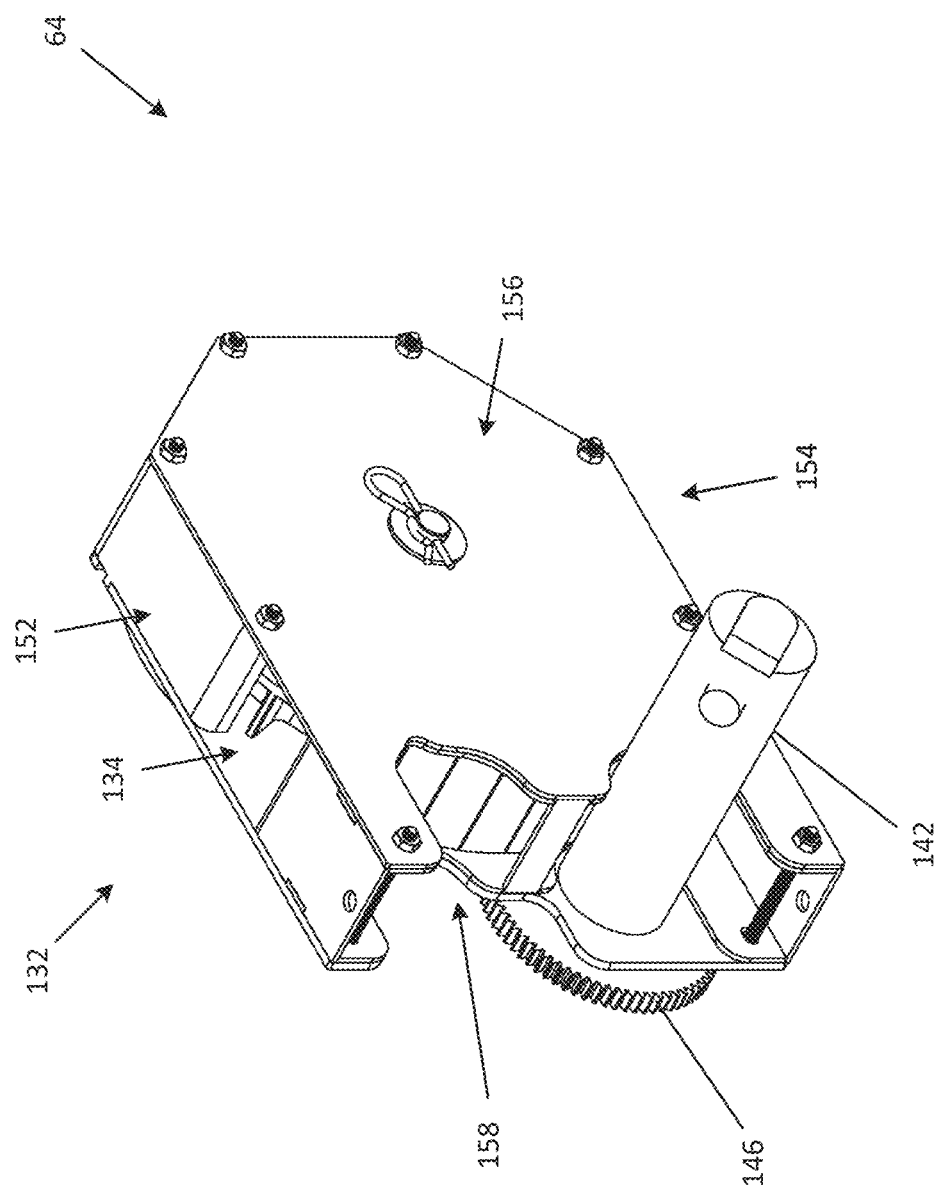
FIG. 26 shows a front left elevated perspective view of a seed meter cartridge, in accordance with one or more embodiments; the view showing the seed meter cartridge with metering gear on the right side.
Figure 27:
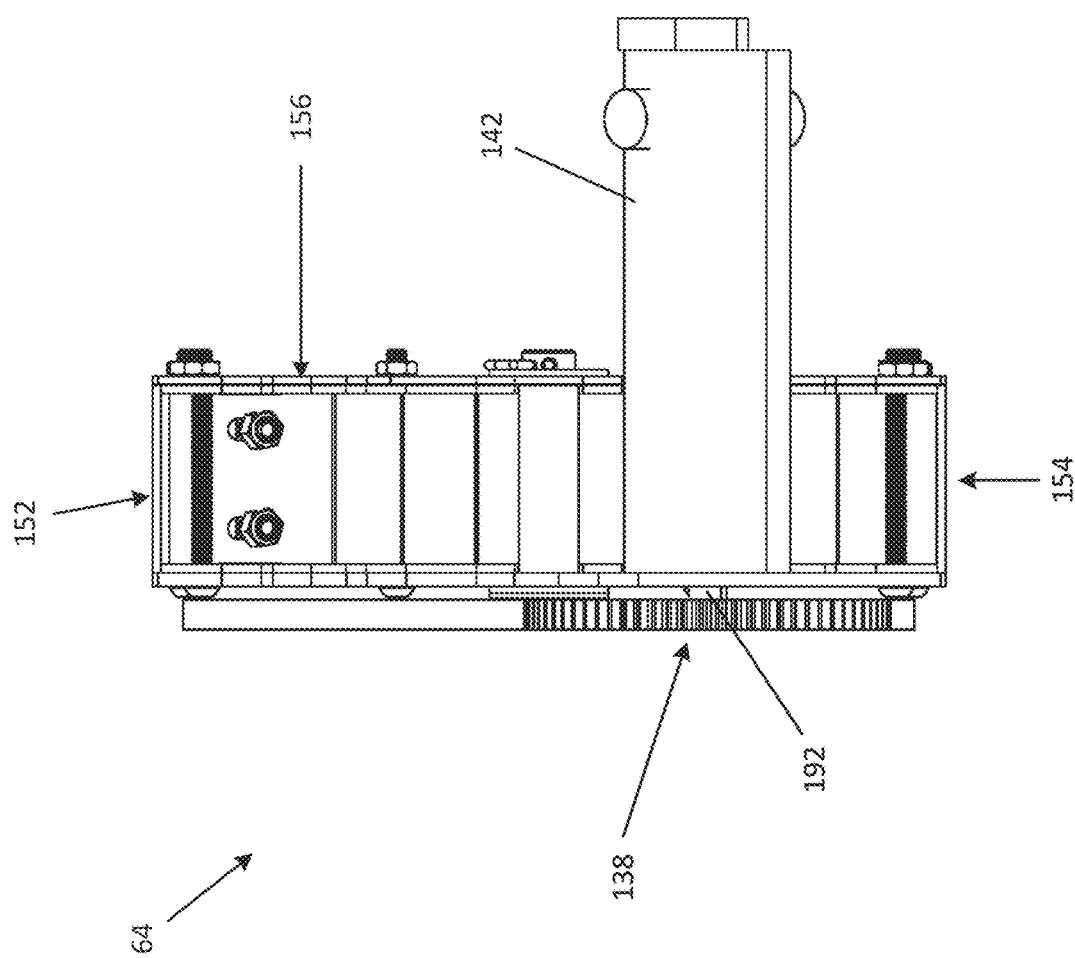
FIG. 27 shows a front view of the seed meter cartridge shown in FIG. 26, in accordance with one or more embodiments; the view showing the seed meter cartridge with metering gear on the right side.
Figure 28:
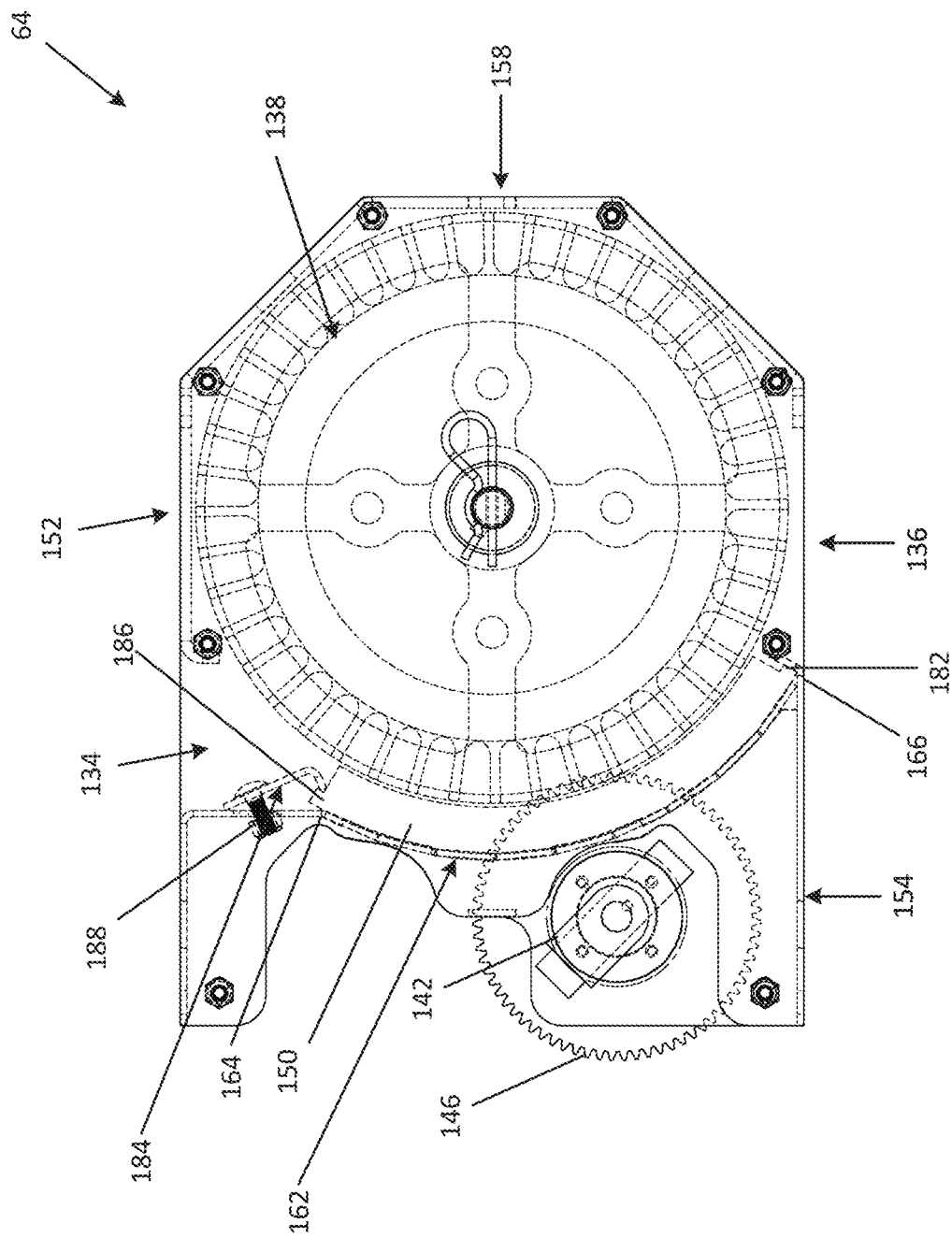
FIG. 28 shows a cutaway left side view of the seed meter cartridge shown in FIG. 26, in accordance with one or more embodiments; the view showing a brush positioned along the curved interior wall of the housing.
Figure 29:
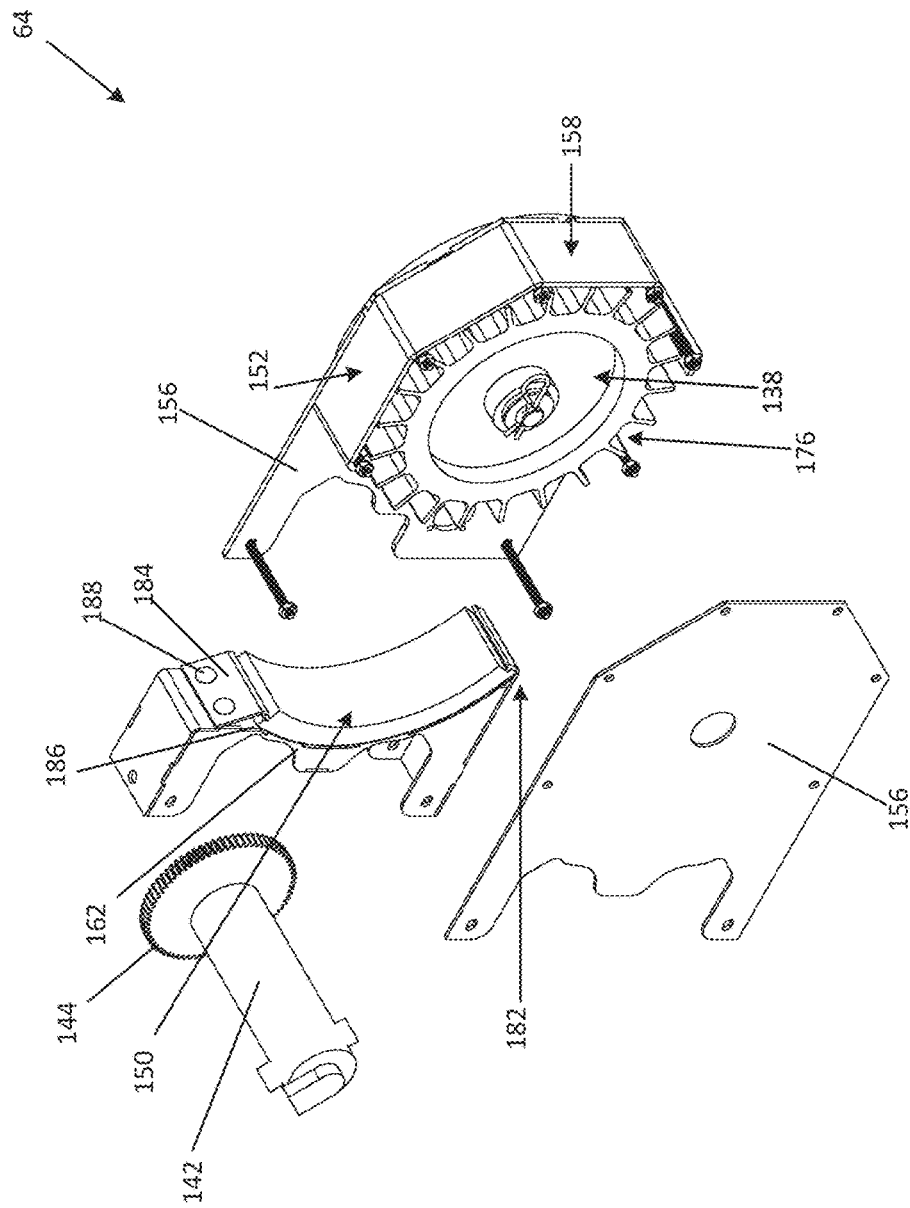
FIG. 29 shows an exploded rear left elevated perspective view of the seed meter cartridge shown in FIG. 26, in accordance with one or more embodiments; the view showing a brush positioned along the curved interior wall of the housing.
Figure 30:
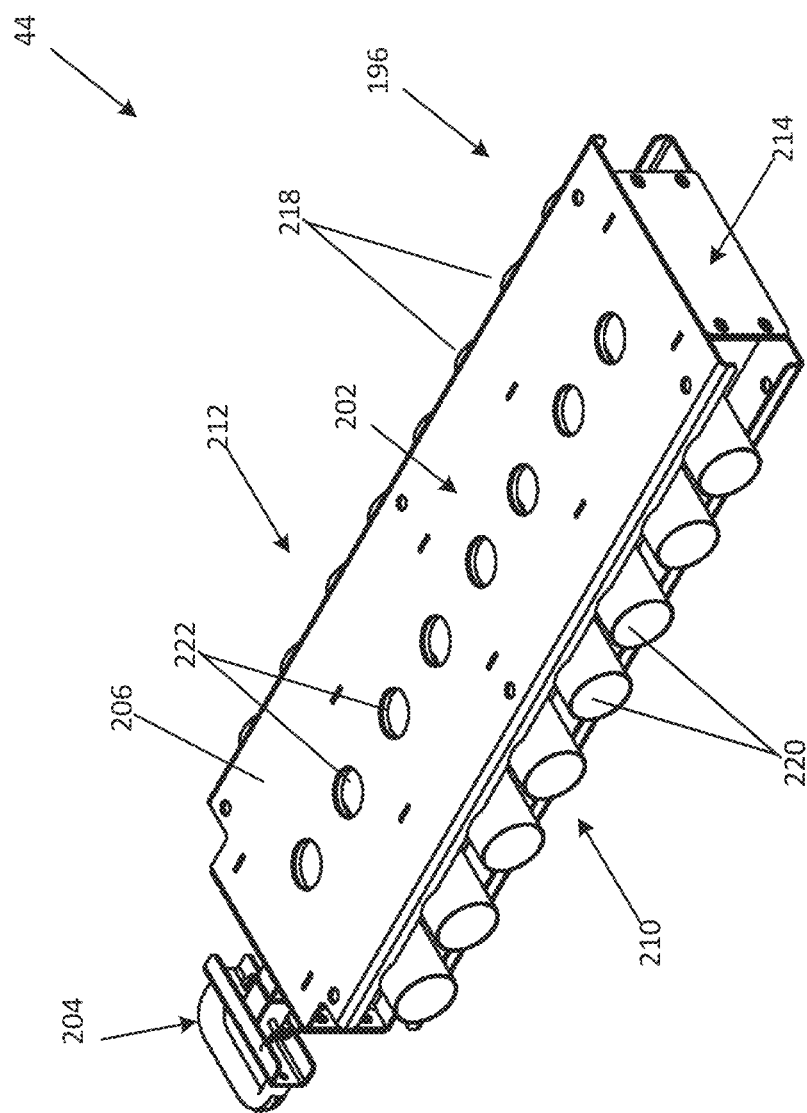
FIG. 30 shows a front left elevated perspective view of an insertion assembly of an air transportation system, in accordance with one or more embodiments.
Figure 31:
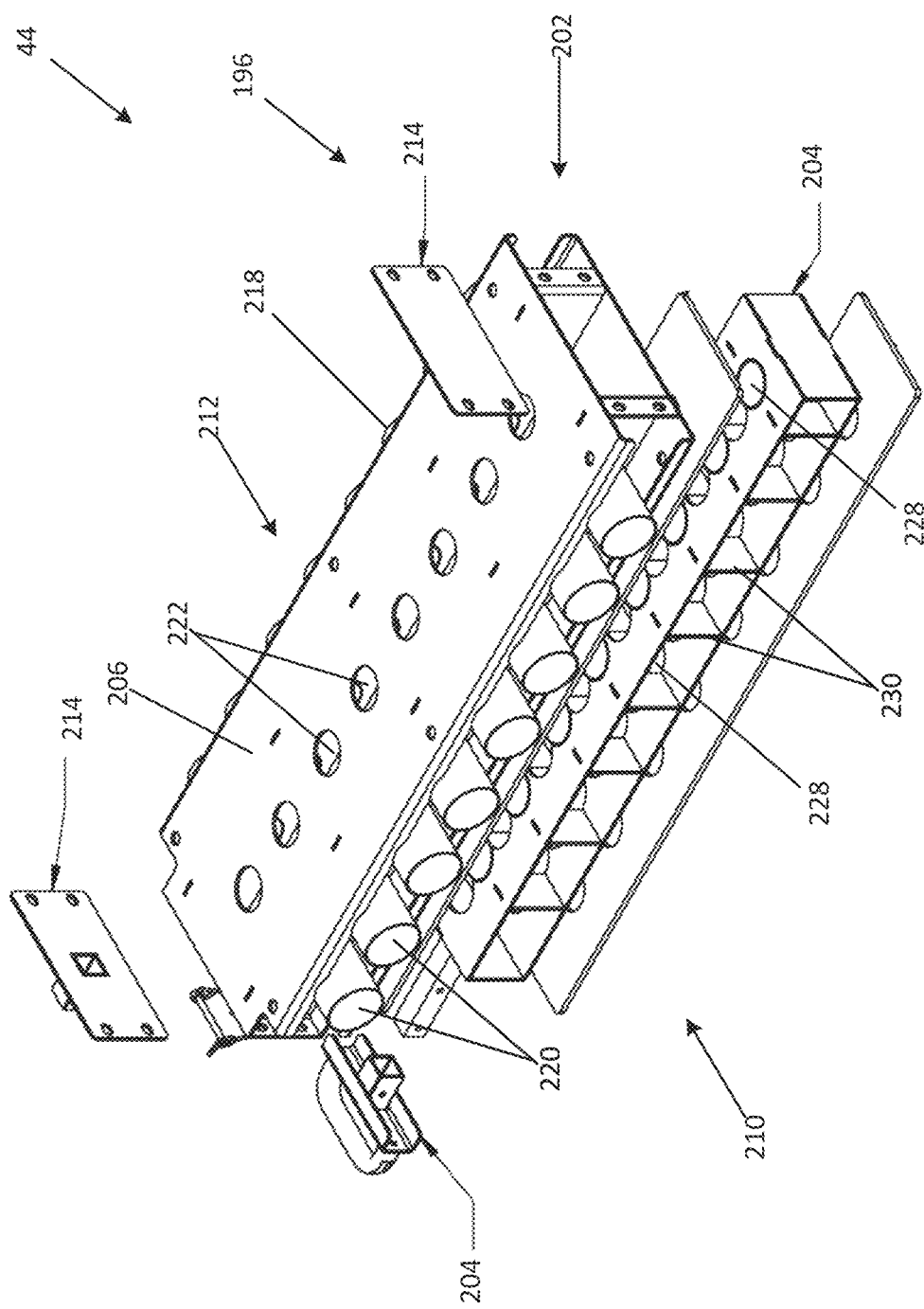
FIG. 31 shows an exploded front left elevated perspective view of the insertion assembly shown in FIG. 30, in accordance with one or more embodiments.
Figure 32:
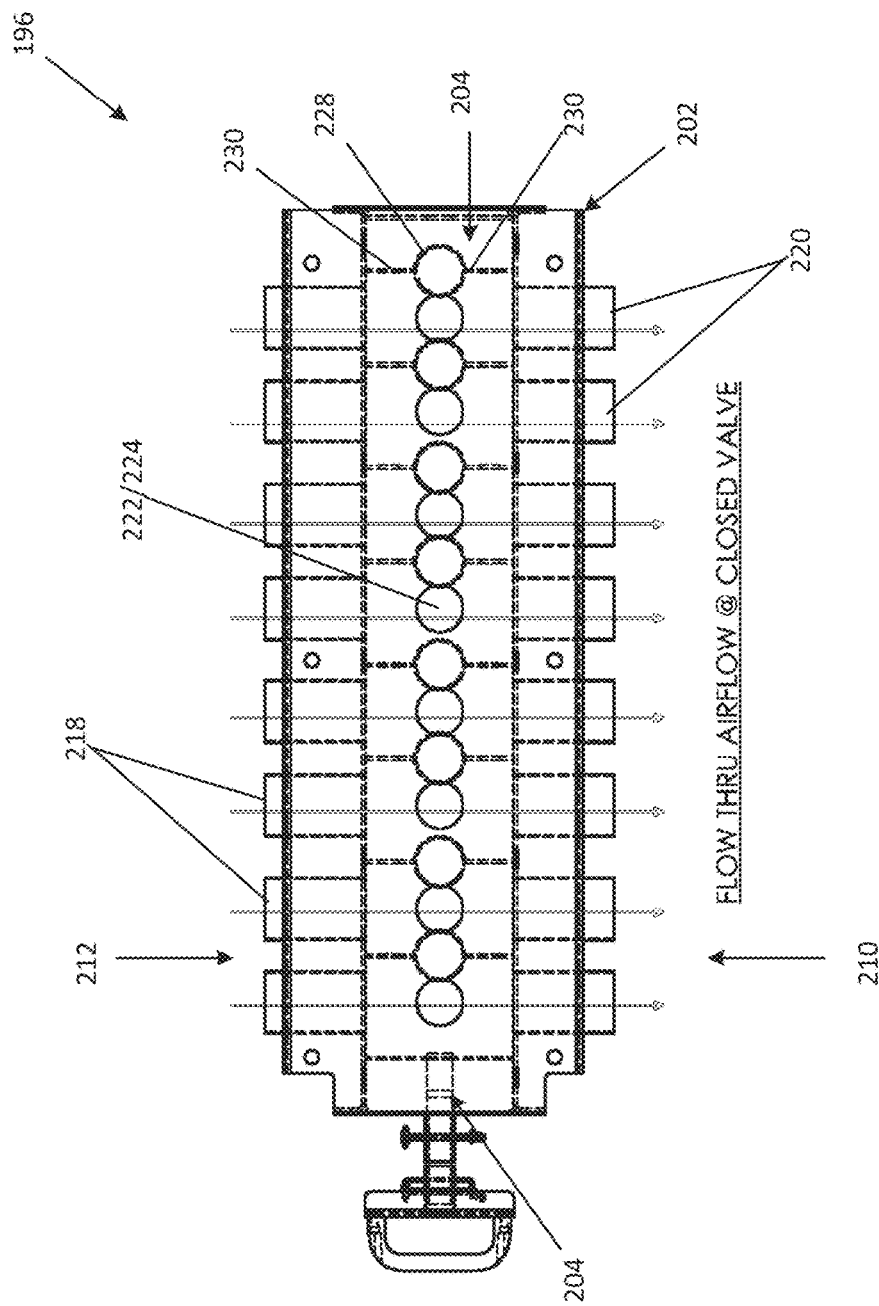
FIG. 32 shows a top view of the insertion assembly shown in FIG. 30, in accordance with one or more embodiments; the view showing an inner section positioned to cause flowable material to be inserted into an airstream passing from intake vents to exhaust vents.

FIG. 33 shows a top view of the insertion assembly shown in FIG. 30, in accordance with one or more embodiments; the view showing an inner section positioned to cause flowable material to bypass the insertion assembly and not be inserted into an airstream passing from intake vents to exhaust vents.

FIG. 34 shows a front view of the insertion assembly shown in FIG. 30, in accordance with one or more embodiments; the view showing an inner section positioned to cause flowable material to be inserted into an airstream passing from intake vents to exhaust vents.

FIG. 35 shows a front view of the insertion assembly shown in FIG. 30, in accordance with one or more embodiments; the view showing an inner section positioned to cause flowable material to bypass the insertion assembly and not be inserted into an airstream passing from intake vents to exhaust vents.

FIG. 36 shows a cutaway side view of the insertion assembly shown in FIG. 30, in accordance with one or more embodiments.

FIG. 37 shows a top view of a distribution manifold, in accordance with one or more embodiments.

FIG. 38 shows an elevated perspective view of a distribution manifold, in accordance with one or more embodiments.

FIG. 39 shows a side view of a distribution manifold, in accordance with one or more embodiments.

FIG. 40 shows a flow diagram of an example process for controlling distribution manifolds and seed meter cartridges of a metering manifold, in accordance with one or more embodiments.

DETAILED DESCRIPTION

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.
Figure 33:
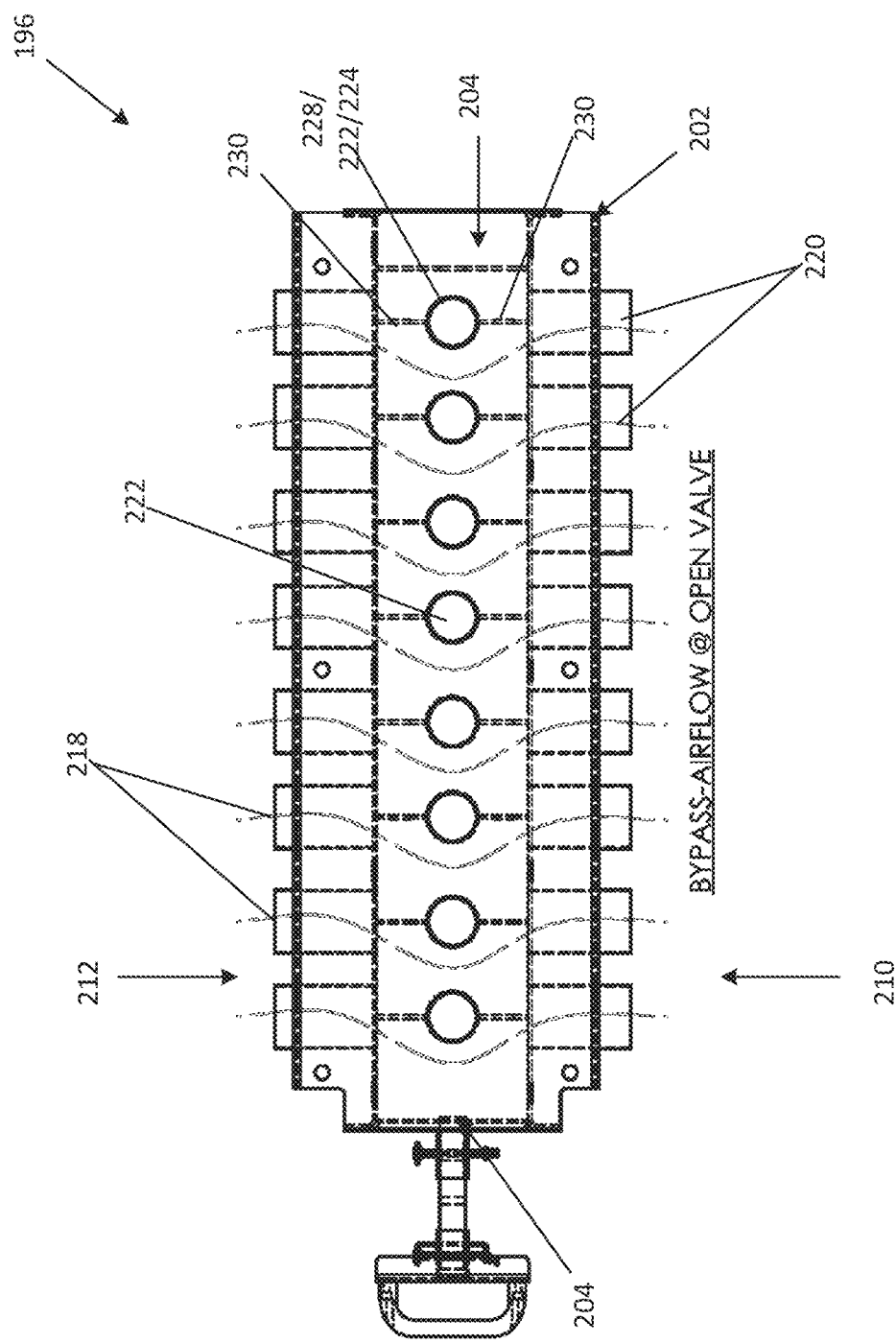
Figure 34:
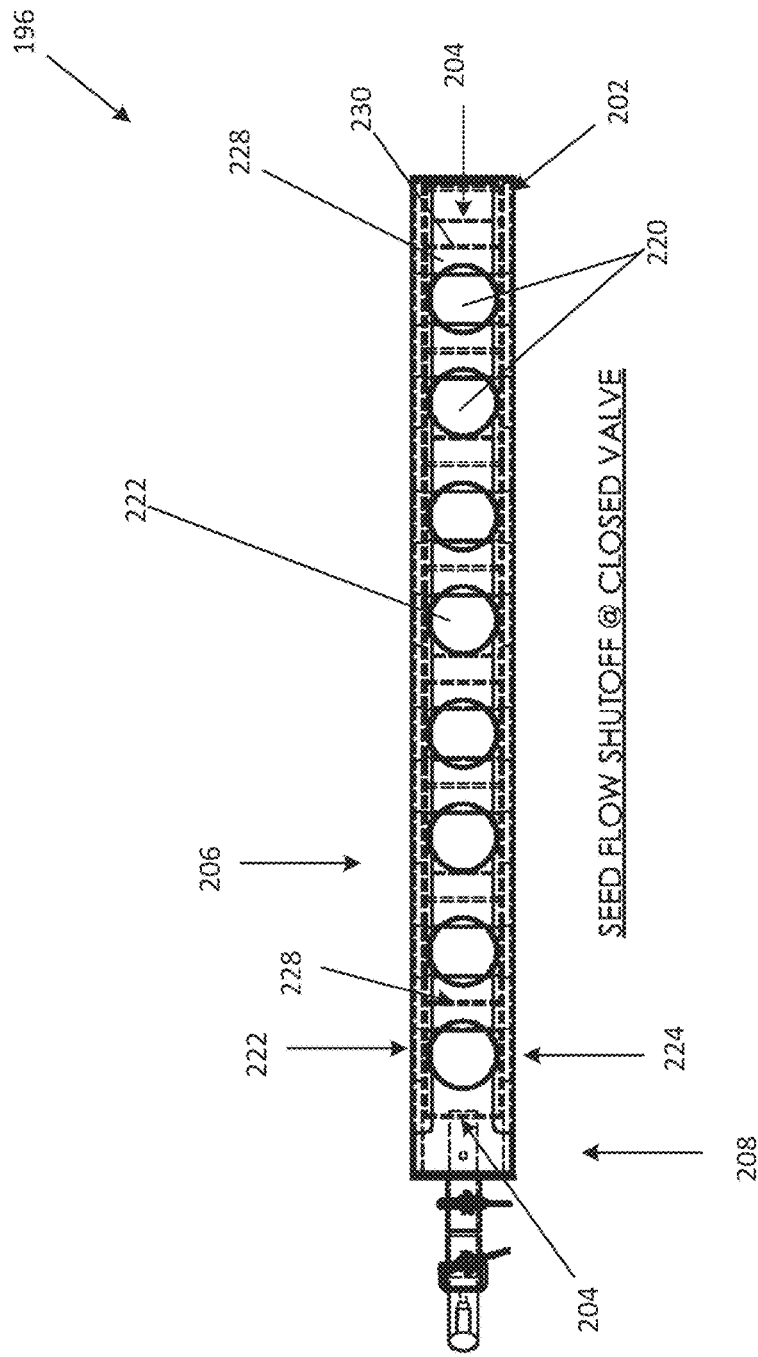
Figure 35:
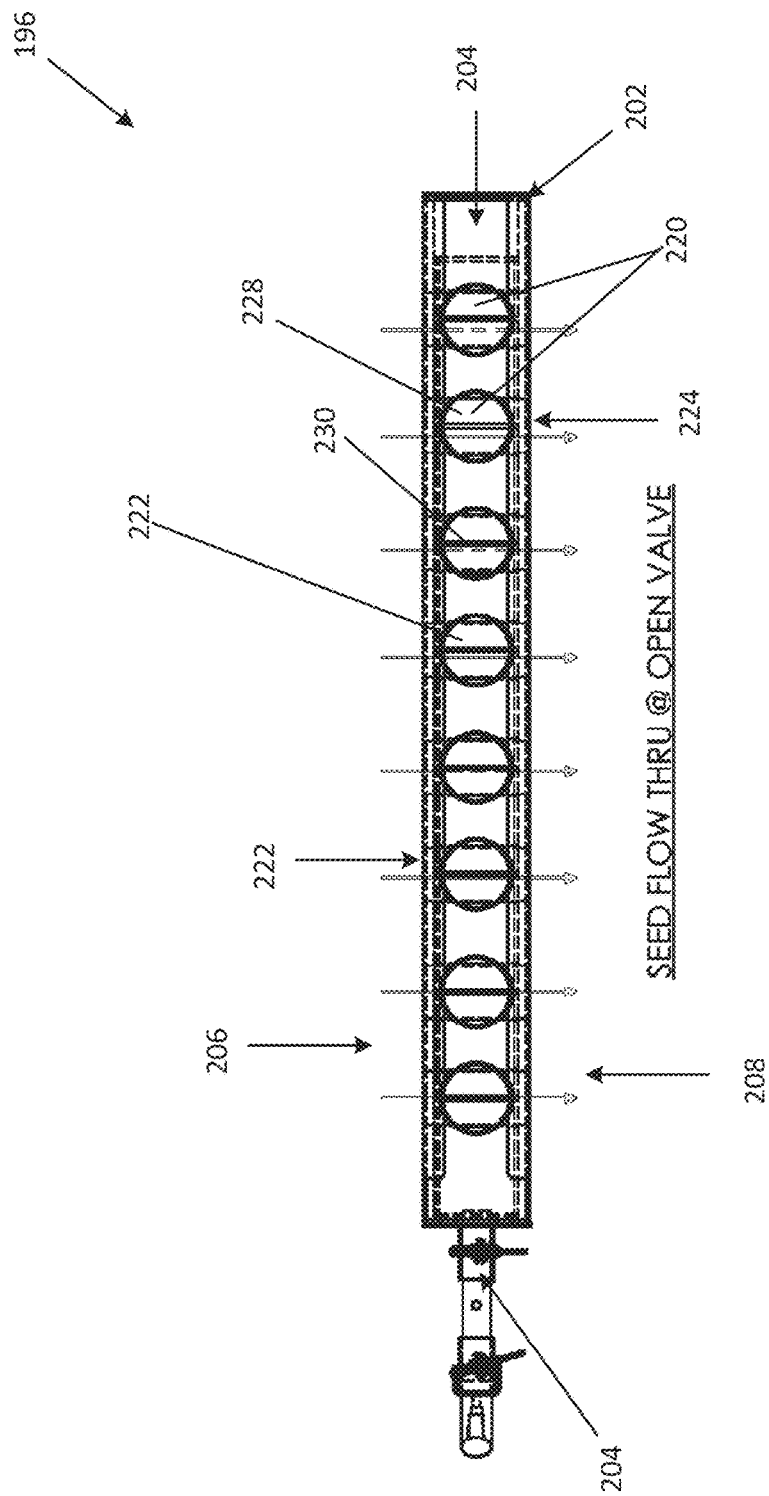
Figure 36:
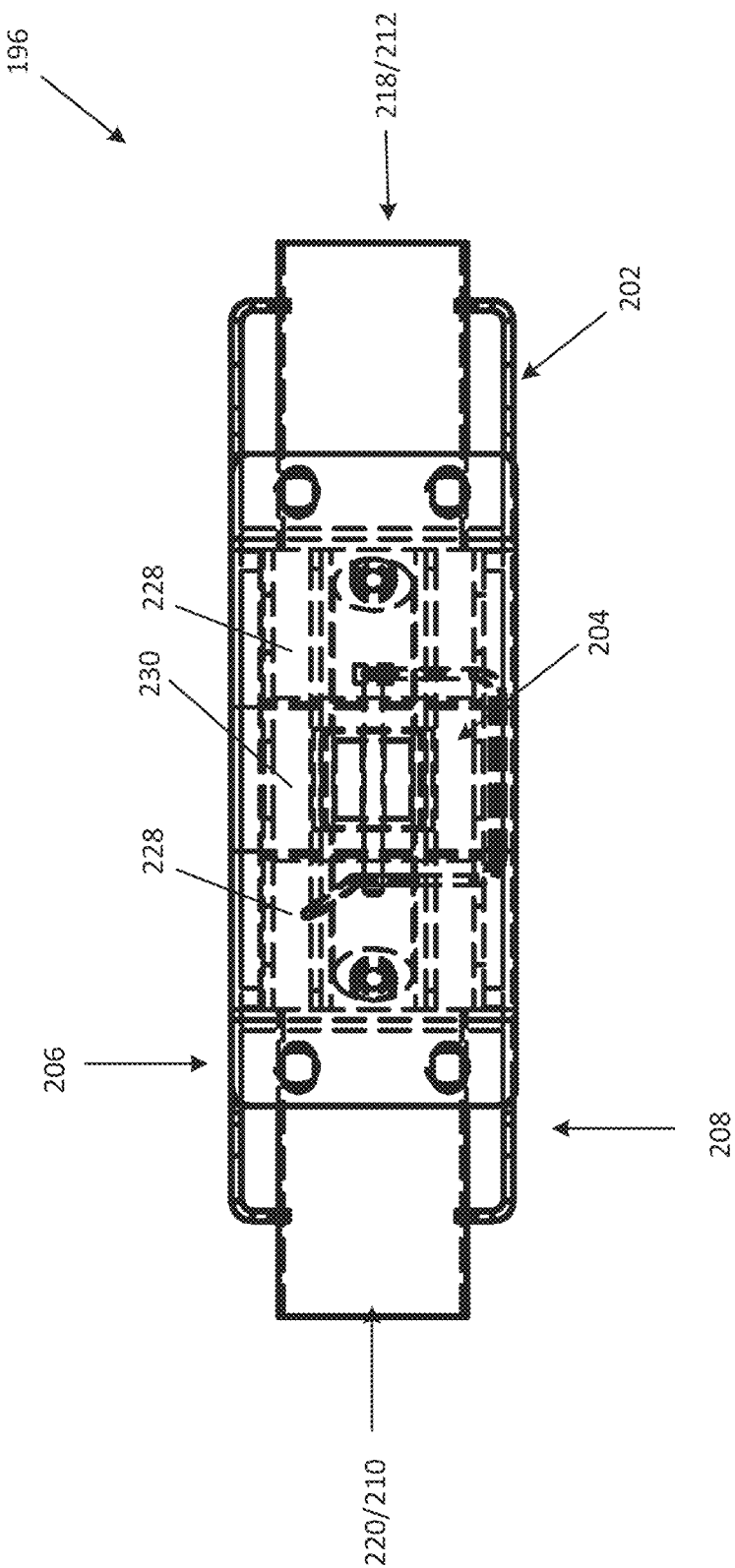
Figure 37:
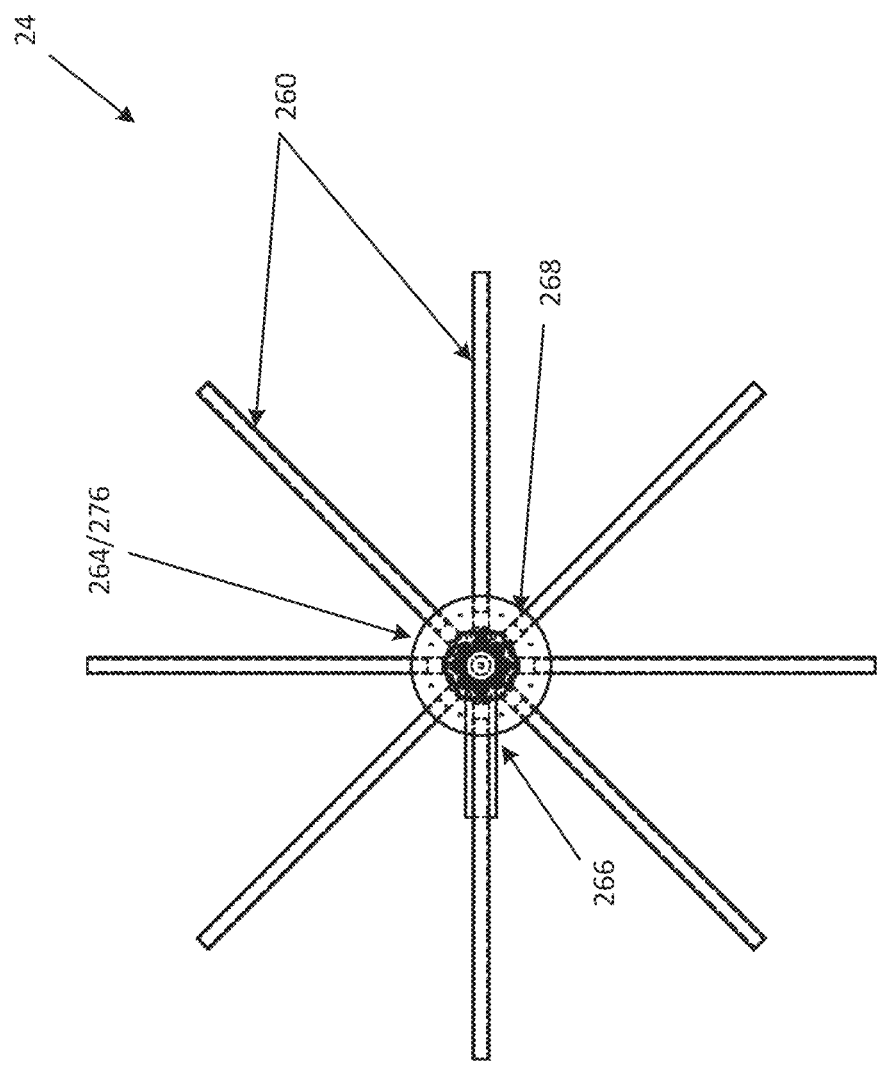
Figure 38:
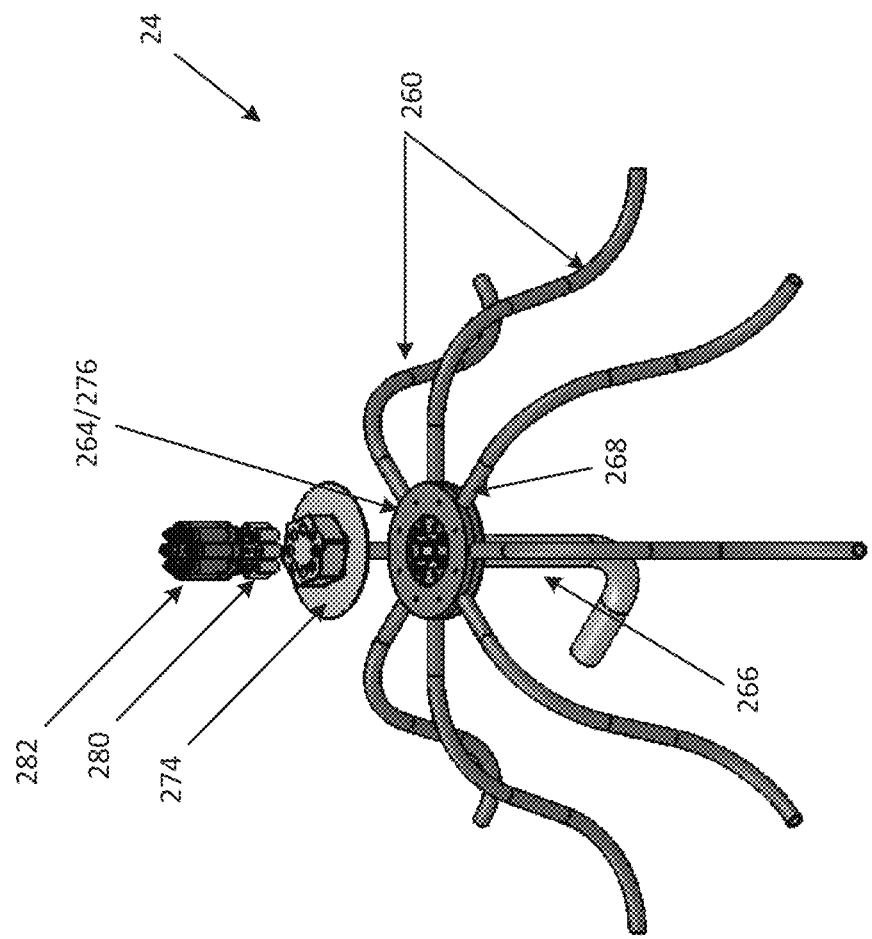

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, or sequentially, to provide looping or other series of operations aside from single operations described below. It should be presumed that any embodiment or method having features and functionality described below, in any workable combination, falls within the scope of example embodiments.

Various disclosed embodiments may be primarily described in the context of agricultural seed planting using air seeder techniques. However, the embodiments are not so limited. It is appreciated that the embodiments may be adapted for use in other applications which may be improved by the disclosed structures, arrangements and/or methods. The system is merely shown and described as being used in in the context of agricultural planting for ease of description and as one of countless examples.

For illustrative purposes and ease of explanation, the disclosed systems and arrangements are primarily described in the context of a commodity cart 12 and a planter 18 configured to apply/disperse/spread/plant flowable material 16 as they are pulled through a field 26 by a tractor 28. In this example context, flowable material 16 may include but is not limited to, for example, seed, fertilizer, pesticide, insecticide, and/or various other agricultural soil treatments. In the example shown, commodity cart 12 is pulled ahead of planter 18. However, embodiments are not so limited. Rather, in various applications, commodity cart 12 may be pulled behind planter 18, in between multiple planters 26, or in various other arrangements.

System 10:

With reference to the figures, a variable rate air metering system 10 (or simply system 10) is presented. The system 10 is formed of any suitable size, shape and design and is configured to provide flowable material to a plurality of row units 20 of a planter 18, facilitate enabling/disabling flow of the flowable material to individual row units 20, and facilitate variable metering of a rate at which the flowable material is provided to the row units.

In an arrangement shown, as one example, the system 10 includes: a commodity cart 12 for holding flowable material; a planter 18 having row units 20 in a plurality of sections 22, and distribution manifolds 24 configured to distribute flowable material 16 received from metering assembly 42 to the row units in respective sections 22 as the commodity cart 12 and planter 18 are pulled through a field 26 by a tractor 28; and a control system 30 among other components.

In one or more arrangements, system 10 is configured to dynamically enable and disable flow of flowable material 16 to individual row units 20 so as to eliminate or minimize double planting, such as at the end of rows. System 10 is also configured to dynamically control rate at which flowable material 16 is dispersed by commodity cart 12 to different sections 22 of planter 18.

Commodity Cart 12:

Commodity cart 12 is formed of any suitable size, shape and design and is configured to provide a mobile structure for transporting flowable material in tow with planter 18 and to control the rate at which flowable material is provided to various sections 22 of planter 18 as it is moved through field 26. In the arrangement shown, as one example, commodity cart includes a frame 36, a set of wheels 38, bins 40 for holding flowable material 16, a metering assembly 42, and an air transport system 44, among other components.

Frame 36:

In one or more arrangements, the frame 200 is formed of any suitable size, shape and design and is configured to interconnect and support the set of wheels 38, bins 40, metering assembly 42, and air transport system 44. In the arrangement shown, as one example, frame 36 extends between a front end 50 and a rear end 48 and extends between opposing sides 52. In this example arrangement, the frame 200 includes a connection member 56 at the front end 50 and rear end 48 of the frame 36 for operably connecting commodity cart 12 with planter 18 and/or tractor 28 for towing.

Wheels 38

In one or more embodiments, commodity cart 12 includes a set of wheels 38 connected to frame 36 and configured to hold the frame 36 and other components of commodity cart 12 above the ground for transport in field 26. In various embodiments, the lift wheels 38 may be formed of any suitable size, shape and design and are configured to connect to the hold and support frame 36 at a suitable height for use in the field 26.

Bins 40:

Bins 40 (also referred to as hoppers or tanks) are formed of any suitable size, shape and design and are configured to hold flowable material 16 and feed the flowable material in bulk to metering assembly 42. In the arrangement shown, as one example, commodity cart 12 includes four bins that can be used to hold up to hold various flowable materials. However, embodiments are not so limited. Rather, it is contemplated that, in various arrangements, commodity cart 12 may include any number of bins 40

Metering Assemblies 42:

Metering assemblies 42 are formed of any suitable size, shape and design and are configured to received flowable material 16 from bins 40 and provide the flowable material to air transport system 44 at controlled rates for transportation to distribution manifolds 24 of planter 18. In the arrangement shown, as one example, a metering assembly 42 includes a slidable gate assembly 60, a manifold 62, and seed meter cartridges 64 among other components.

Slidable Gate Assembly 60:

Slidable gate assembly 60 is formed of any suitable size, shape and design and is configured to selectable enable and cutoff flow of flowable material 16 from bins 40 to manifold 62 of metering assembly 42. In the arrangement shown, as one example, slidable gate assembly 60 has an upper receiver 68 and a lower slidable gate 70.

Upper Receiver 68:

Upper receiver 68 of slidable gate assembly 60 is formed of any suitable size, shape or design and is configured to receive and direct flowable material from a bin 40 to a set of openings 74. In the arrangement shown, as one example, upper receiver 68 includes a generally rectangular planar shaped bottom 72 having openings 74 formed therein and a front 76, a back 78, and opposing sides 80 extending upward from edges of the bottom 72. In this example arrangement, the front 76, back, 78, and sides 80 form a funnel that receives flowable material from bin 40 through an open upper end and directs the flowable material to openings 74 in bottom 72 of upper receiver 68. In operation, flowable material flows through openings 74 into inlets 124 of manifold 62 unless prevented by slidable gate 70.

Slidable Gate 70:

In one or more arrangements, slidable gate assembly 60 includes a slidable gate 70 attached to a bottom side of bottom 72 of upper receiver 68. Slidable gate 70 is formed of any suitable size, shape, or design and is configured to facilitate opening and closing of openings 74. In one or more arrangements, slidable gate 70 has a generally rectangular planar shape extending a length of bottom 72 of upper receiver 68 and having openings 84 therein. In one or more example arrangements, slidable gate 70 is configured to move within from side to side along bottom 72 between an open position and a closed position. For example, in some implementations slidable gate 70 may be configured to move side to side within a channel or track formed in the bottom surface of bottom 72. However, it is envisioned that various embodiments may utilize various other structures to facilitate side to side movement of slidable gate 70 relative to bottom 72.

Openings 84 are formed of any suitable size, shape, or design and are configured to facilitate opening and closing openings 74 via sliding of slidable gate 70. In the arrangement shown, as one example, openings 84 have the same approximate shape as openings 74. In this example arrangement, when slidable gate 70 is in the open position, openings 84 are aligned with openings 74 and permit flowable material 16 to pass therethrough. Conversely, when slidable gate 70 is in the closed position, no portion of openings 84 overlap with openings 74 so slidable gate 70 prevents flowable material 16 from passing through openings 84.

In one or more arrangements, slidable gate assembly 60 includes a locking mechanism 88. Locking mechanism 88 is formed of any suitable size, shape, or design and is configured to prevent slidable gate 70 from moving side to side to thereby lock slidable gate 70 in the open or closed position. As one example, in some embodiments, locking mechanism 88 may be a lynch pin configured to extend through a hole in slidable gate 70 and a hole in another portion of slidable gate assembly 60 and/or manifold 62. Additionally or alternatively, as another example, locking mechanism may be include a bolt configured to pass through slidable gate 70 and clamp or otherwise hold slidable gate 70 in a fixed position.

Agitator 92:

In some arrangements, slidable gate assembly 60 includes an agitator 92. Agitator 92 is formed of any suitable size, shape, or design and is configured to decrease viscosity of flowable material 16 in slidable gate assembly 60 when moved. In the arrangement shown, agitator 92 includes a shaft 94 extending a length between opposing sides 80 of upper receiver 68 of slidable gate assembly 60. In this example arrangement, agitator 92 includes a set of fingers 96 extending outward from shaft 94 and a lever 98 connected to one end of shaft 94. In this arrangement, movement of lever 98 rotates shaft 94 and causes fingers 96 to be moved upwards or downward to agitate flowable material. In this example arrangement, lever 98 is configured to be operably connected to a motorized wheel 100 by a link 102 (not shown). When motorized wheel 100 is rotated during operation, link 102 moves lever 98 back and forth, which causes fingers 96 to be moved back and forth between an upward position and a downward position by shaft 94. Movement of fingers 96 in this manner gently aids to reduce viscosity of flowable material 16 and facilitate a steady rate of flow.

Manifold 62:

Manifold 62 is formed of any suitable size, shape, or design and is configured to receive and hold seed meter cartridges 64 and facilitate metering of flowable material 16 received from slidable gate assembly 60. In the arrangement shown, as one example, manifold 62 has a top 108, a bottom 110, sides 112, a back 114, and an open front 116.

In this example arrangement, manifold 62 includes a number of vertical dividers 118 extending between top 108 and bottom 110 to form a number of sockets 120. Sockets 120 are formed of any suitable size, shape, or design and are configured to receive and hold seed meter cartridges 64 through open front 116. In this arrangement, seed meter cartridges 64 may easily be removed from sockets 120 of manifold 62 for inspection, maintenance and/or repair without disassembly of manifold 62 or removal of flowable material from binv40. If the bin 40 connected to metering assembly 42 holds flowable material 16, slidable gate 70 may be closed prior to removing seed meter cartridges 64 to prevent flowable material 16 from escaping through an empty socket 120.

In this example arrangement, each socket 120 is configured to receive and hold a pair of seed meter cartridges 64. However, embodiments are not so limited. Rather it is contemplated that, in various arrangements, sockets 120 may be configured to receive and hold any number of seed meter cartridges 64. In various arrangements, seed meter cartridges 64 may be held within sockets by one or more fasteners, connectors, brackets, and/or any other suitable structure. In this example arrangement, seed meter cartridges 64 are held in place by a cover 128 of manifold 62.

In this example arrangement, top 108 includes a set of inlets 124 through which flowable material 16 is passed from the slidable gate assembly 60 to seed meter cartridges 64 in sockets 120. In this example arrangement, bottom 110 includes a set of outlets 126 through which flowable material 16 metered from seed meter cartridges 64 passes to air transport system 44.

Seed Meter Cartridges 64:

Seed meter cartridges 64 are formed of any suitable size, shape, or design and are configured to meter the rate at which flowable material 16 is output by the seed meter cartridges 64. In the arrangement shown, as one example, each seed meter cartridge 64 includes a housing 132 having an input port 134 and output port 136, a meter wheel 138, a variable speed electric motor 142, gears 144 and 160 operably connecting meter wheel 138 to variable speed electric motor 142, and a brush 150, among other components.

Housing 132:

Housing 132 is formed of any suitable size, shape, or design and is configured to hold meter wheel 138 and brush 150 and facilitate metering of flowable material 16 from input port 134 to output port 136 as meter wheel 138 is rotated. In the arrangement shown, as one example, housing 132 as a top 152 having input port 134, a bottom 154 having output port 136, sides 156, a front 158, a rear 160, and a curved interior wall 162.

Curved interior wall 162 is formed of any suitable size, shape, or design and is configured to provide a path for transportation of flowable material 16 by meter wheel 138 from input port 34 to output port 136. In the arrangement shown, as one example, curved interior wall 162 extends between sides 156 of housing 132 from an upper end 164 connected to front 158 to a lower end 166 connected to bottom 154. In this example arrangement, curved interior wall 162 has a curvature that matches that of meter wheel 138 to provide a uniform sized pathway for transportation of flowable material 16.

Meter Wheel 138:

Meter wheel 138 is formed of any suitable size, shape, or design and is configured to transport flowable material 16 from input port 134 to output port 136 of seed meter cartridge 64. In the arrangement shown, as one example, meter wheel 138 has a generally planar circular shape extending outward from a central axis 172 to an outward edge 174. In this example arrangement, meter wheel 138 has recessed pockets 176 in outward edge 174, which are configured to receive flowable material for transport to output ports 136. In this example arrangement, pockets are separated by pocket dividers 178

Brush 150:

In one or more arrangements, seed meter cartridge 64 includes a brush 150 to help prevent damage to flowable material 16 as meter wheel 138 is rotated. For example, in some situations, flowable material may be sheered by or crushed between pocket dividers 178 of meter wheel 138 and curved interior wall 162. Brush 150 is formed of any suitable size, shape, or design and is configured to help gently guide the flowable material 16 entering input port 134 into the pockets 176 of the meter wheel 138 and/or help hold flowable material in pockets 176 as the meter wheel 138 is rotated. By guiding flowable material 16 into pockets 176, the probability of the flowable material 16 being sheered or crushed between pocket dividers 178 of meter wheel 138 and curved interior wall 162 or other portion house housing 132 is reduced. In some arrangements, brush 150 may also provide give to accommodate any flowable material that is unable to fully enter pocket.

In the arrangement shown, as one example, brush 150 extends along curved interior wall 162 from upper end 164 to lower end 166. However, embodiments, are not so limited. Rather, it is contemplated that, in some arrangements, brush 150 may only extend along a portion of interior wall 162. Additionally or alternatively, brush 150 may be formed by multiple brush segments.

In some arrangements, brush 150 is configured to be removed and replaced in housing 132. In the arrangement shown, as one example, housing 132 includes connection features 182 and 184 configured to hold a removable brush 150 in place. In this example arrangement, a lower connection feature 182 includes a lip configured to hold a lower end of brush 150 in place. In this example arrangement, an upper connection feature 184 includes a bracket that is placed over a lip 186 of brush 150 and held in place by a fastener 188.

Variable Speed Electric Motor 142:

Variable speed electric motor 142 is formed of any suitable size, shape, or design and is configured to be adjustable, independent of other seed meter cartridges, to operate as multiple speeds while rotating at an accurate and relatively constant rate and any given speed. In various arrangements, variable speed electric motor 142 may be implemented with various types of electric motors including but not limited to, for example, DC motors, AC motors, brushed motors, brushless motors, stepper motors, servo motors, linear motors, and/or any other electric motor.

In the arrangement shown, as one example, variable speed electric motor 142 is attached to housing 132 of seed meter cartridge 64 an has a motor shaft 192 connected to a motor gear 144. In this example arrangement, motor gear 144 is positioned to engage meter gear 146, which is operably connected to meter wheel 138. In this example arrangement meter gear 146 is much larger than motor gear 144, thereby permitting motor to turn meter wheel 138 as a constant set speed with a high level of accuracy.

In the arrangement shown, as one example, the pair of seed meter cartridges 64 in each socket 120 have two different configurations to facilitate compact design. In the arrangement shown, as one example, the right most seed meter cartridge 64 in each socket 120 has a meter wheel 138 positioned on the right side of the seed meter cartridge 64. Conversely, in this example, the left most seed meter cartridge 64 in each socket 120 has a meter wheel 138 positioned on the left side of the seed meter cartridge 64. This arrangement permits variable speed electric motors 142 of the pair of seed meter cartridges 64 to be overlapped, thereby requiring less space. In this example arrangement, polarity of variable speed electric motor 142 for the left most cartridge 64 is the opposite of the polarity of variable speed electric motor 142 for the right most seed meter cartridge 64 so as to facilitate rotation of meter wheels 138 of the pair of seed meter cartridges 64 in the same direction.

In Operation: flowable material flows through inlets 124 of manifold 62 and in through input ports 134 of seed meter cartridges 64 in sockets 120 of manifold 62. Variable speed electric motors 142 of seed meter cartridges 64 are operated to rotate gears 144 and 146 and thereby rotate meter wheels 138. The speed at which the meter wheels 138 are rotated determines the rate at which flowable material 16 is metered by the seed meter cartridges 64. The speed at which each variable speed electric motors 142 is operated may be adjusted to adjust the meter rate of individual seed meter cartridges 64.

As meter wheels 138 are rotated, flowable material is guided into pockets 176 of meter wheels 138 by brushes 150 and is transported from the input port 134 to the output port 136. Upon reaching output port 136, flowable material 16 falls out of pockets 176 and through outlets 126 in bottom 110 of manifold 62 of metering assembly 42 to air transport system 44.

Air Transport System 44:

Air transport system 44 is formed of any suitable size, shape, or design and is configured to receive flowable material 16 from metering assembly 42 and transport flowable material 16 output by seed meter cartridges 64 in respective airflows to distribution manifolds 24 in respective sections 22 of planter 18. In the arrangement shown, the air transport system 44 includes an insertion assembly 196 and at least one set of tubes 198 or conduits, among other components.

Insertion Assembly 196:

Insertion assembly 196 is formed of any suitable size, shape, or design and is configured to receive flowable material 16 output from each seed meter cartridge 64, insert the flowable material from seed meter cartridge 64 into a respective airflow, and provide the resulting airflow to a respective one of the set of tubes 198.

In the arrangement shown, as one example, insertion assembly 196 is configured to either insert flowable material into a respective set of tubes 198 or pass received flowable material 16 to another insertion assembly 196. In the arrangement shown, as one example, insertion assembly 196 has an outer section 202 and a slidable inner section 204 having a top 206, a bottom 208, a front 210, a back 212, and sides 214. Intake vents 218 in back 212 and exhaust vents in front 212 that connect with the respective set of tubes 198. Airflows through the set of tubes 198 enter through intake vents 218 in back 212 and exit through exhaust vents in front 210. Top 206 has openings 222 for receiving flowable material 16 and bottom 208 has openings 224 for passing flowable material to another insertion assembly 196.

In this example arrangement, slidable inner section 204 has a set of conduits 228 extending between top 206 and bottom 208 of outer section 202. Slidable inner section 204 also has walls 230 extending forward from conduits 228 to front 210 and extending rearward from conduits 228 to back 212 of outer section 202. Slidable inner section 204 is movable from side to side between a bypass position and an insertion position. In the insertion position, tubes are not aligned with openings 222/224. In this position, flowable material 16 entering openings 222 is inserted into the respective airstreams flowing from intake vents 218 to exhaust vents 220. The set of tubes 198 transport the airflows and flowable material(s) 16 to distribution manifolds 24 in respective sections 22 of planter 18. In the bypass position, flowable material 16 entering openings 222 in top 206 is transported by conduits 228 to openings 224 in bottom 208 and is not inserted in the airstreams. In this position, airstreams flow from intake vents 218 to exhaust vents 220 flow around the conduits 228 and walls 230.

In the arrangement shown, as one example, air transport system 44 includes multiple different sets of tubes 198 that can be used to transport different types of flowable materials 16 from bins 40 of commodity cart 12 to various distribution manifolds 24 of planter 18. In one or more arrangements, air transport system 44 includes multiple stacked insertion assemblies 196, each configured to insert flowable material 16 into airflows of a respective set of tubes 198. When an upper insertion assembly 196 is in bypass mode, flowable material 16 is passed to a next lower insertion assembly 196, which may be configured to insert the flowable material 16 into airstream in another set of tubes 198 or pass the flowable material 16 to a yet lower insertion assembly 196. The lowest insertion assembly 196 for a bin 40 may be set to either insert the flowable material into airstream in a respective set of tubes 198 or pass flowable material 16 out of the system (e.g., to facilitate clearing all flowable material 16 from a bin 40).

In one or more arrangements, system 10 includes multiple bins 40 and air transport system 44 includes multiple insertion assemblies 196, each configured to insert flowable material 16 into the set of tubes 198 from one of the bins 40. In this example arrangement, insertion assemblies 196 for the different bins 40 are connected by the set of tube 198 in a daisy chain with the intake vents 218 of a downstream insertion assembly 196 connected to exhaust vents 220 of an upstream insertion assembly 196. In this arrangement, downstream insertion assembly 196 will pass the airstream and any flowable material received from the upstream insertion assembly 196 regardless of whether the slidable inner section 204 is positioned to insert flowable material from the downstream bin into the airstream.

Planter 18:

Planter 18 is formed of any suitable size, shape and design and is configured to facilitate mounting of row units 20 for use in the field and mounting distribution manifolds 24 for distributing flowable material 16 to mounted row units 20. In the arrangement shown, planter 18 includes a frame 238, wheels 240, a tool bar 242, row units 20, and distribution manifolds 24, among other components.

Frame 238:

In various embodiments, the frame 238 may be formed of any suitable size, shape and design that is configured to interconnect and support and wheels 240, tool bar 242, distribution manifolds 24, and row units 20 attached to tool bar 242 and also facilitate towing by a tractor. In the arrangement shown, as one example, frame 238 extends between a front end 246 and a rear end 248 and extends between a right side 250 and a left side 252. In this example arrangement, the frame 238 includes a connection member 56 at the front end 246 of the frame 238 for planter 18 to a hitch of a tractor 28, commodity cart 12, or another planter 18 for towing in a field.

Wheels 240:

In one or more embodiments, planter 18 includes a set of wheels 240 connected to frame 238. The set of wheels are configured to hold the frame 238 and/or tool bar 242 above the ground when the front end 246 of the frame 238 is connected to a tractor. In various embodiments, the wheels 240 may be formed of any suitable size, shape and design and are configured to connect to the hold and support frame 238 at a suitable height for use in the field.

Tool Bar 242 and Row Units 20:

In various embodiments, tool bar(s) 242 is formed of any suitable size, shape and design and is configured to connect with and support row units 20 and distribution manifolds 24 on planter 18 for use in the field. In various arrangements, tool bar(s) 242 is connected to frame 238 and extends outward to opposing outward ends 244. In various arrangements, tool bar(s) 242 is configured to connect with and support various types of row units 20 for use in the field. Row units 20 may include but are not limited to, for example, seed planters (e.g., air Seeders, vacuum seeders, drill seeders, or any other type of seeder), fertilizer/treatment applicators, tillers, cultivators, irrigation systems, and/or various other ground working implements alone or in combination. In the arrangement shown, row units are arranged in a plurality of sections 22 and are connected to receive flowable material 16 from a respective distribution manifold 24 for the section 22.

Distribution Manifolds 24:

Distribution manifolds 24 are formed of any suitable size, shape and design and are each configured to receive an airflow and flowable material 16 from one of the set of tubes 198 and split the airflow and flowable material 16 for distribution through a set of secondary tubes 260 or conduits to row units 20 in a particular section 22 of the planter 18.

In one or more arrangements, distribution manifolds 24 are configured to selectably enable and disable the airflow and flowable material 16 to individual row units in the section 22. Such arrangements permit distribution to row units to be adjusted on the fly (e.g., to avoid double planting when planting of a tract requires planter to cross over an area already planted). In some arrangements, system 10 may be implemented using various commercially available distribution manifolds 24 that are capable to enabling and disabling the airflow and flowable material 16 to individual row units in response to a control system (e.g., control system 30).

In one or more arrangements, an improved distribution manifold 24 is provided. In the arrangement shown, as one example, distribution manifold 24 includes a body 264 having an input 266 and a plurality of row outputs 288.

Body 264:

Body 264 is formed of any suitable size, shape and design is configured to distribute airflow and flowable material 16 from input 266 to row outputs 288. In the arrangement shown, as one example, body 264 has a generally circular top 274 and bottom 272 and a cylindrical shaped sidewall 276 extending between top 274 and bottom 272. In this example arrangement, input 266 is located in bottom 272.

Input 266:

Input 266 is formed of any suitable size, shape and design is configured to facilitate connection with one of the set of tubes 198 to receive airflow and flowable material from metering assembly 42 of commodity cart 12. In one example arrangement, input 266 is a short tube connected to an opening of body 264 and over which one of the set of tubes 198 may be placed and clamped thereon (e.g., using a hose clamp).

Outputs 268:

Outputs 288 are formed of any suitable size, shape and design are configured to facilitate connection with the set of secondary tubes 260 to provide airflow and flowable material 16 to row units 20. Similar to input 266, in one example arrangement, outputs 268 include short tubes connected to openings of body 264 and over which set of secondary tubes 260 may be placed and clamped thereon. In the arrangement shown, outputs 288 each include a gate 280 and an actuator 282.

Gate 280:

Gate 280 is formed of any suitable size, shape and design is configured to open the output 268 to permit air and flowable material 16 to be provided to a row unit 20 operably connected to the output 268 and close the output 268 to prevent air and flowable material 16 from being provided to the row unit 20. In the arrangement shown, as one example, gate 280 is a plunger configured to block airflow through output 268 when lowered and permits airflow through output 268 when raised.

Actuator 282:

Actuator 282 is formed of any suitable size, shape and design is configured to open and close gate 280 in response to a control signal. In one or more arrangements, actuator 282 may be implemented using for example, a pneumatic solenoid, an electric solenoid, an electric motor, and/or any other device configured to provide movement in response to a control signal.

Pressure Regulator 286:

Through careful observation, it has been discovered that pressure changes in manifold resulting from opening/closing one or more gates 280 can dramatically affect distribution of flowable material 16 by row units. In one or more arrangements, distribution manifold includes a pressure regulator to address this issue. Pressure regulator 286 (not shown) is formed of any suitable size, shape and design is configured to release air pressure from distribution manifold to mitigate increases in air pressure (e.g., resulting from closing of a gate 280). In one or more arrangement, as one example, pressure regulator may include, for example, a spring loaded pressure relief value, balanced spring loaded pressure relief valve, a pilot operated pressure relief valve, a dead weight pressure relief valve, power actuated safety relief valves, and/or any other valve of device configured to prevent pressure from exceed a set pressure.

Control System 30:

Control system 30 is any suitable technology, arrangement, or design, and is configured to control operation of the distribution manifolds 32 and metering assembly 42 to facilitate dynamic enabling and disabling the flow of flowable material 16 to individual row units 20 while also controlling rate at which grain is provided by metering assembly to the distribution manifolds 32 in various sections 22 of planter 18.

In one or more arrangements, control system 30 is configured to automatically enable/disable flow of flowable material 16 to individual row units 20 of planter 18 based on a position, trajectory, speed of the tractor 28, commodity cart 12, and/or planter 18, and/or a field prescription plan. In various implementations, a field prescription plan may specify, for example, geographic boundaries of field 26, geographic boundaries of various sections of a field 26, row direction, planned paths for tractor 28, target flowable material densities (e.g., seed population rates) in different sections, paths, and/or rows of field 26, among other data.

Through careful observation, it has been discovered that enabling/disabling flow of flowable material 16 to a row unit 20 can dramatically affect dispersion rate of flowable material 16 by other row units 20 in the same section 22 of the planter. In one or more arrangements, control system 30 is configured to control variable speed electric motors 142 of seed meter cartridges 64 to automatically adjust rate at which flowable material(s) are provided to a distribution manifold 24 when gates 280 of outputs 268 are opened or closed to maintain intended dispersion rates at row units 20.

In one or more arrangements, control system 30 is configured to automatically adjust metering rate or control variable speed electric motors 142 of seed meter cartridges 64 in response to gates 280 of outputs 268 of distribution manifolds 24 being opened or closed to compensate for the change in dispersion rate of row units 20. However, it is recognized that, due to the distance flowable materials 16 travel through the set(s) of tubes 198 to distribution manifolds, there will be certain delay before adjustment to variable speed electric motors 142 of seed meter cartridges 64 can compensate. For some applications, population variation caused by such delay may not be tolerable.

In one or more arrangements, control system 30 is configured to automatically adjust metering rate of control variable speed electric motors 142 of seed meter cartridges 64 prior to trigging gates 280 of outputs 268 of distribution manifolds 24 to open or closed to ensure that flowable material(s) 16 are dispersed by row units 20 at intended rates when gates 280 are opened or closed.

Figure 39:
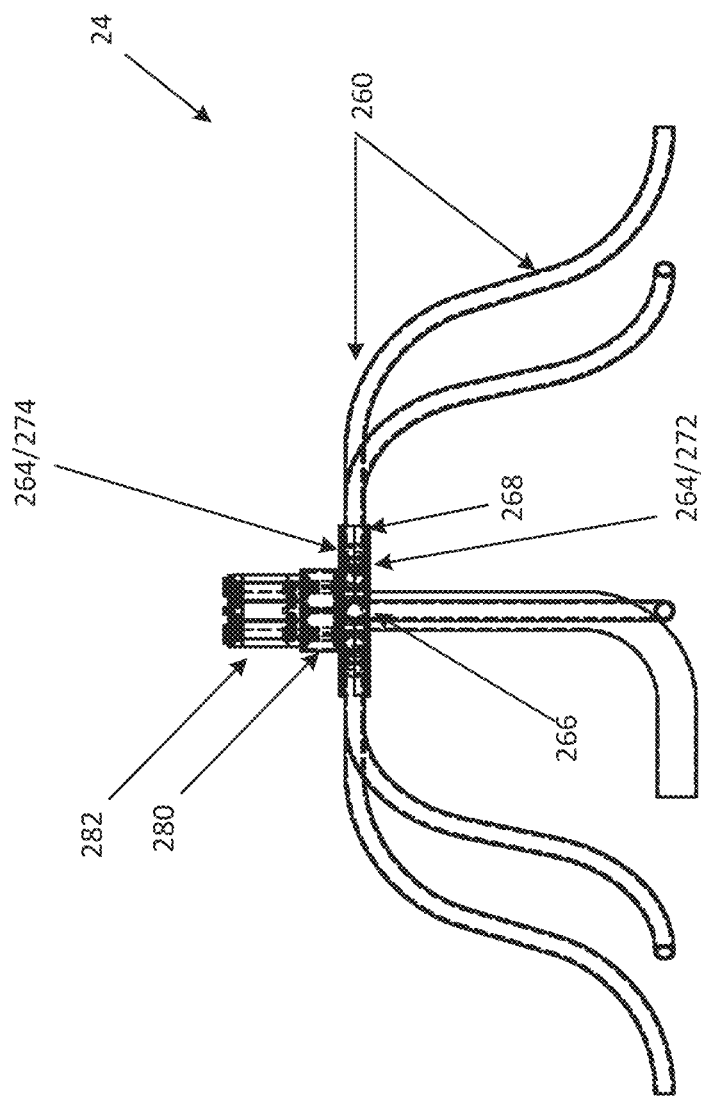
Figure 40:
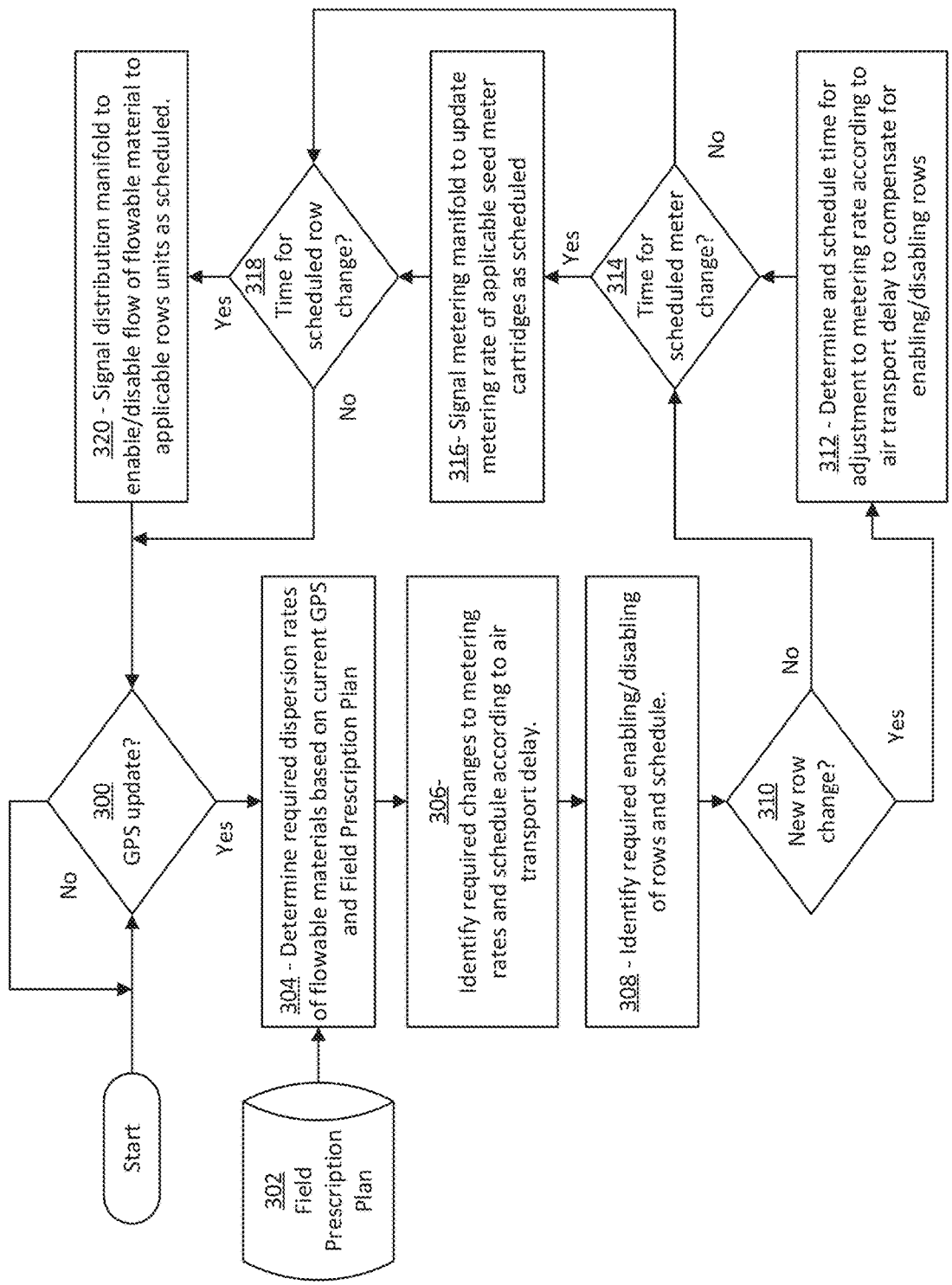

FIG. 39 shows an example process that may be performed by control system 30 to control seed meter cartridges 64 and distribution manifolds 24 during operation. In this example process, adjustments enabling/disabling row units 20 or adjusting metering rates of seed meter cartridges 64 are performed based on GPS location data and a field prescription plan 302 (e.g., stored in a memory of control system 30). At the start of this example process, the process waits at decision block 300 until new GPS data is received by control system 30. When GPS data is received, the process proceeds to block 304, where the process determines required dispersion rates of various flowable material(s) 16 based on the GPS data and a field prescription plan 302. In some embodiments, the determination of dispersion rates may additionally be based on current trajectory and/or speed of tractor 28 and/or based on data measurements received from one or more sensors 290. At block 306, the process determines if any upcoming changes to metering rates will be required. For any upcoming change, the process determines a time for the change based on, for example, current speed of tractor 28 and air transport delay from seed meter cartridges 64 to affected row units 20 at block 306 and schedules the required change to metering rates.

At block 308, the process determines if any upcoming changes to the number of rows will be required (e.g., to avoid double planting). For any upcoming change, the process determines a time for the change based on, for example, current speed of tractor 28 and schedules the enabling/disabling flow of flowable material 16 to applicable row units. If a new row change is scheduled, the process proceeds to block 312. Otherwise, the process proceeds ahead to decision block 314. At block 312, the process determines and schedules a time to adjust metering rates for the section 22 of planter 18 in which flow to a row unit(s) will be enabled/disabled. The time is determined based on, for example, current speed of tractor 28 and air transport delay from seed meter cartridges 64 to distribution manifold 24 of the section.

At decision block 314, if it is time for a scheduled meter change, the process proceeds to block 316, otherwise the process proceeds to decision block 318. At block 316, metering manifold is signaled to adjust the rate of applicable seed meter cartridges as scheduled. The process then proceeds to decision block 318. At decision block 318, if it is time for a scheduled row change, the process proceeds to block 320, otherwise the process proceeds to back to decision block 300. At block 320, the distribution manifold 24 that is scheduled to be changed is signaled to enable/disable flow of flowable material 16 to applicable row units as scheduled. The process then proceeds to back to decision block 300, where the process waits until new GPS data is received. The process repeats in this manner as tractor 28 pulls planter 18 and commodity cart 12 through field 26.

It is envisioned that the disclosed processes and functionality of control system 30 may be incorporated into any of a variety of commercially available intelligent controllers. In various arrangements, control system may be positioned, onboard the tractor 28, commodity cart 12, planter 18, and/or any location where control system 30 is communicatively connected to metering assembly 42, distribution manifolds 24 and/or tractor 28. Control system 30 may be implanted on a chip, an expansion card, or a stand-alone device that interfaces with a peripheral device. There may be a link between the control system 30 and the peripheral or the control system 30 can be built into, in the same housing or otherwise at least partially integrated with the motors. Control system 30 could be a master system or a subsystem of another control system.

In one or more arrangements, control system 30 includes a communication circuit configured to facilitates communication of data between control system 30 and tractor 28, commodity cart 12, planter 18, and/or other components of system 10. In various arrangements, the communication circuit may be configured to communicate using various protocols over various networks including but not limited to, for example, IsoBUS, 802.11/Wi-fi, Wi-Max, Bluetooth, UltraWideband (MB), 802.15.4/ZigBee, ZWave, GSM/EDGE, UMTS/HSPAH+/HSDPA, CDMA, LTE, and/or FM/VHF/UHF networks.

In one or more arrangements, control system 30 may be configured to additionally or alternatively adjust metering rate of seed meter cartridges 64 based on measurements of one or more sensors 290 (not shown) that are communicatively connected to control system 30. Sensors 290 may be configured to monitor various metrics including but not limited to, for example, speed of meter wheels 138 or variable speed electric motors 142, tractor speed, gradient of field 26, flowable material 16 density measurements of airflows, air pressures, temperature, humidity, altitude, soil chemistry measurements, and/or any other environmental data metric.

In one or more arrangements, control system 30 may be communicatively connected to a user interface (not shown). Control system 30 may receive commands from user interface to facilitate manual enabling/disabling of row units 20 and/or adjustment of metering rates of seed meter cartridges 64. This could be by electromechanical switches. Alternatively, it could be icons on a touchscreen display in tractor 28, tablet, smartphone, or other device communicatively connected to control system 30 via one or more data networks.

Various blocks, modules, or other circuits may be implemented to carry out one or more of the operations and activities described herein and/or shown in the figures. In these contexts, a "block" (also sometimes "logic circuit", "control circuit," "controller," "module", "device" or simply "circuit") is an electrical circuit specifically configured and arranged to carry out one or more of these or related operations/activities. For example, control circuits may be discreet logic circuits or programmable logic circuits configured and arranged for implementing these operations/activities, as shown in the figures and/or described in the specification. In certain embodiments, such a programmable circuit may include one or more programmable integrated circuits (e.g., field programmable gate arrays and/or programmable ICs). Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of instructions (and/or configuration data). The instructions (and/or configuration data) can be in the form of firmware or software stored in and accessible from a memory (circuit). Certain embodiments are directed to a computer program product (e.g., nonvolatile memory device), which includes a machine or computer-readable medium having stored thereon instructions which may be executed by a computer (or other electronic device) to perform these operations/activities.

From the above discussion it will be appreciated that the disclosed system improves upon the state of the art. More specifically, and without limitation, it will be appreciated that the system: facilitates metering and distributing flowable materials to row units for planting or other dispersing in a field that also permits rows to be enables/disabled during operation; dispenses flowable materials (e.g., seed, fertilizer, soil treatments, and/or other flowable materials) at a variable rate and while facilitating row control so as to reduce excess planting and seed waste; decreases overhead costs for flowable materials; facilitates dynamic adjustment of dispersement rate of flowable materials according to varying field conditions; facilitates dynamic adjustment of dispersement rate of flowable materials as rows are dynamically enabled/disabled according to varying field conditions; increases consistency in dispersement rate of flowable materials in a field; provides unique functionality; is safe to use; is compact in size; is efficient; is easy to install; is inexpensive to manufacture; has a long useful life; is high quality; and/or is strong, robust, and durable. These and other objectives, aspects, features, or advantages will become apparent from the specification, figures, and claims.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. It is intended that the specification and illustrated embodiments be considered as examples only, with a true scope of the invention being indicated by the following claims.

The invention claimed is:

1. A variable rate air metering system, comprising:
a seed meter cartridge;
the seed meter cartridge having a housing;
the seed meter cartridge having a meter wheel;
the seed meter cartridge having a variable speed electric motor operatively connected to the meter wheel;
wherein the variable speed electric motor is configured to control rotation of the meter wheel;
a distribution manifold;
the distribution manifold having an input;
the distribution manifold having a plurality of row outputs
a control system;
the control system configured to control operation of the seed meter cartridge and the distribution manifold;
wherein the seed meter cartridge is configured to provide flowable material to the distribution manifold;
wherein the distribution manifold is configured to distribute flowable material to the plurality of row outputs for deposition into a field;
wherein the control system is configured to control opening and closing of the plurality of row outputs of the distribution manifold;
wherein the control system is configured to adjust the rate of output of the seed meter cartridge in association with opening or closing the plurality of row outputs.

2. The system of claim 1, wherein:
each of the plurality of row outputs of the distribution manifold has a gate that is configured to open and close; and
each of the plurality of row outputs of the distribution manifold has an actuator configured to open and close the gate.

3. The system of claim 1, wherein:
each of the plurality of row outputs of the distribution manifold has a gate that is configured to open and close; and
each of the plurality of row outputs of the distribution manifold has an actuator configured to open and close the gate;
the control system is configured to control a rate at which flowable material is dispersed by the seed meter cartridge and transported to the input of the distribution manifold by adjusting the speed of the variable speed electric motor of the seed meter cartridge;
the control system is configured to adjust the rate at which flowable material is dispersed by the seed meter cartridge, using the variable speed electric motor, to inhibit changes in the rate at which flowable material is provided through one of the plurality of row outputs having an open gate when the gate of another one of the plurality of row outputs is opened or closed.

4. The system of claim 1, wherein:
each of the plurality of row outputs of the distribution manifold has a gate that is configured to open and close; and
each of the plurality of row outputs of the distribution manifold has an actuator configured to control the gate that is configured to open and close;
the control system is configured to control a rate at which flowable material is dispersed by the seed meter cartridge to the input of the distribution manifold by adjusting the speed of the variable speed electric motor of the seed meter cartridge;
the control system is configured to adjust the rate at which flowable material is dispersed by the seed meter cartridge, using the variable speed electric motor, to maintain a constant rate at which flowable material is provided through one of the plurality of row outputs having an open gate when the gate of another one of the plurality of row outputs is opened or closed.

5. The system of claim 1, wherein:
each of the plurality of row outputs of the distribution manifold has a gate that is configured to open and close;
each of the plurality of row outputs of the distribution manifold has an actuator configured to open and close the gate,
wherein the actuator is an electric solenoid.

6. The system of claim 1, wherein:
each of the plurality of row outputs of the distribution manifold has a gate that is configured to open and close;
each of the plurality of row outputs of the distribution manifold has an actuator configured to open and close the gate,
wherein the actuator is a pneumatic solenoid.

7. The system of claim 1, further comprising, an insertion assembly fluidly connected to the distribution manifold and configured to receive the flowable material from the seed meter cartridge and transport the flowable material to the distribution manifold by inserting the flowable material into an airflow moving from the insertion assembly to the distribution manifold.

8. The system of claim 1, wherein the seed meter cartridge includes a housing;
wherein the seed meter cartridge includes a meter wheel;
wherein the seed meter cartridge has an input port;
wherein the seed meter cartridge has an output port;
the meter wheel having a plurality of pockets;
wherein the plurality of pockets of the meter wheel are configured to receive flowable material therein;
the seed meter cartridge having a variable speed electric motor operatively connected to the meter wheel;
wherein the variable speed electric motor is configured to control rotation of the meter wheel;
wherein rotation of the meter wheel by the variable speed electric motor is configured to transport the flowable material in the plurality of pockets from the input port to the output port.

9. The system of claim 1, wherein the seed meter cartridge includes a housing;
wherein the seed meter cartridge includes a meter wheel;
wherein the seed meter cartridge has an input port;
wherein the seed meter cartridge has an output port;
the meter wheel having a plurality of pockets;
wherein the plurality of pockets of the meter wheel are configured to receive flowable material therein;
the seed meter cartridge having a variable speed electric motor operatively connected to the meter wheel;
wherein the variable speed electric motor is configured to control rotation of the meter wheel;
a brush;
the brush positioned within the housing of the seed meter cartridge;
wherein the brush is configured and arranged to help guide the flowable material into the plurality of pockets of the meter wheel as the meter wheel rotates;
wherein rotation of the meter wheel by the variable speed electric motor is configured to transport the flowable material in the plurality of pockets from the input port to the output port.

10. A variable rate air metering system, comprising:
a manifold
the manifold having a plurality of inlets;
the manifold having a plurality of outlets;
the manifold having a plurality of sockets;
a plurality of seed meter cartridges;
each of the seed meter cartridges having a housing;
each of the seed meter cartridges having a meter wheel;
each of the seed meter cartridges having a variable speed electric motor operatively connected to the meter wheel, wherein the variable speed electric motor is configured to control rotation of the meter wheel;
wherein in each of the seed meter cartridges, rotation of the meter wheel by the variable speed electric motor causes the meter wheel to dispense flowable material from the seed meter cartridge;
wherein the manifold is configured to receive and hold the plurality of seed meter cartridges within the plurality of sockets;
wherein the manifold has an open front end configured to permit the plurality of seed meter cartridges to be individually inserted into and removed from the plurality of sockets through the open front end of the manifold;
wherein the variable speed electric motor of each of the plurality of seed meter cartridges is configured to control a rate at which flowable material is dispensed from the seed meter cartridge.

11. The system of claim 10, wherein the plurality of seed meter cartridges are configured to be connected in pairs.

12. The system of claim 10, wherein each of the plurality of sockets is configured to receive a connected pair of seed meter cartridges therein.

13. The system of claim 10, wherein the plurality of seed meter cartridges are configured to be connected in pairs;
wherein in each of the seed meter cartridges, the meter wheel is operably connected to the variable speed electric motor by a meter gear positioned on a side of the housing;
wherein in each of the pairs, a first seed meter cartridge of the pair has the meter gear positioned on a right side of the housing;
wherein in each of the pairs, a second seed meter cartridge of the pair has the meter gear positioned on a left side of the housing.

14. The system of claim 10, wherein the manifold is operably connected to a hopper and is configured to receive flowable material from the hopper.

15. The system of claim 10, further comprising
a slidable gate assembly;
wherein the manifold is operably connected to a hopper by the slidable gate assembly;
wherein the manifold is configured to receive flowable material from the hopper through the slidable gate assembly when the slidable gate assembly is open;
wherein the slidable gate assembly is configured to prevent the manifold from receiving the flowable material when the slidable gate assembly is closed.

16. The system of claim 10, wherein for each of the plurality of seed meter cartridges:
the seed meter cartridge has an input port;
the seed meter cartridge has an output port;
the meter wheel has a plurality of pockets;
wherein the plurality of pockets of the meter wheel are configured to receive flowable material therein;
wherein rotation of the meter wheel by the variable speed electric motor is configured to transport the flowable material in the plurality of pockets from the input port to the output port;
the seed meter cartridge has a brush;
the brush positioned within the housing of the seed meter cartridge;
wherein the brush is configured and arranged to help guide the flowable material into the plurality of pockets of the meter wheel as the meter wheel rotates.

17. A variable rate air metering system, comprising:
a seed meter cartridge;
the seed meter cartridge having a housing;
the seed meter cartridge having a meter wheel;
the meter wheel having a plurality of pockets;
wherein the plurality of pockets of the meter wheel are configured to receive flowable material therein;
the seed meter cartridge having a variable speed electric motor operatively connected to the meter wheel;
wherein the variable speed electric motor is configured to control rotation of the meter wheel;
the seed meter cartridge having an input port;
the seed meter cartridge having an output port;
a brush;
the brush positioned within the housing of the seed meter cartridge;
wherein the brush is configured and arranged to help guide the flowable material into the plurality of pockets of the meter wheel as the meter wheel rotates;
wherein rotation of the meter wheel by the variable speed electric motor is configured to transport the flowable material from the input port to the output port.

18. The system of claim 17, wherein the brush is positioned between the input port and the output port.

19. The system of claim 17, wherein the brush extending along an inner surface of the housing between the input port and the output port.

20. The system of claim 17, wherein rotation of the meter wheel by the variable speed electric motor is configured to transport the flowable material from the input port to the plurality of pockets;
wherein rotation of the meter wheel by the variable speed electric motor is configured to transport the flowable material from the plurality of pockets to the output port.

* * * * *